United States Patent
Cheung Yeung et al.

(10) Patent No.: US 6,185,197 B1
(45) Date of Patent: Feb. 6, 2001

(54) CONTROL MESSAGE TRANSMISSION IN TELECOMMUNICATIONS SYSTEMS

(75) Inventors: Joemanne Chi Cheung Yeung, Wootton; Jonathan A. Thompson, Newbury; Martin Lysejko, Bagshot; Guy A. Cooper, Windsor, all of (GB)

(73) Assignee: Airspan Networks, Inc., Seattle, WA (US)

( * ) Notice: Under 35 U.S.C. 154(b), the term of this patent shall be extended for 0 days.

(21) Appl. No.: 08/973,283

(22) PCT Filed: Jun. 3, 1996

(86) PCT No.: PCT/US96/08659

§ 371 Date: Mar. 17, 1998

§ 102(e) Date: Mar. 17, 1998

(87) PCT Pub. No.: WO96/38967

PCT Pub. Date: Dec. 5, 1996

(30) Foreign Application Priority Data

| Jun. 2, 1995 | (GB) | ................................................. 9510870 |
| Jun. 2, 1995 | (GB) | ................................................. 9511167 |
| Jun. 2, 1995 | (GB) | ................................................. 9511189 |
| Jun. 2, 1995 | (GB) | ................................................. 9511192 |

(51) Int. Cl.[7] ........................................................ H04J 3/22
(52) U.S. Cl. ............................ 370/328; 370/401; 370/466
(58) Field of Search ................................... 370/328, 329, 370/345, 346, 466, 467, 469; 375/222

(56) References Cited

U.S. PATENT DOCUMENTS

| 5,301,303 | 4/1994 | Abraham et al. | ...................... 395/500 |
| 5,392,283 | * 2/1995 | Bocci et al. | ........................... 370/329 |
| 5,471,471 | * 11/1995 | Freeburg et al. | ..................... 370/343 |
| 5,655,001 | * 8/1997 | Cline et al. | ........................... 370/328 |

FOREIGN PATENT DOCUMENTS

| 0526106 | 2/1993 | (EP) | .............................. H04Q/11/04 |
| 2267016 | 11/1993 | (GB) | .............................. H04L/29/06 |
| 9408415 | 4/1994 | (WO) | .............................. H04L/12/66 |

OTHER PUBLICATIONS

Liba Svobodova, et al., "Heterogeneity and OSI", IEEE, Jan. 1990, vol. 8, No. 1, pp. 67–79.

* cited by examiner

Primary Examiner—Min Jung
(74) Attorney, Agent, or Firm—Baker Botts L.L.P.

(57) ABSTRACT

A communications protocol interface is arranged at a central station of a telecommunications network and is responsive to a control message received from a network controller in accordance with a first message protocol to transmit the control message in accordance with a second message protocol to subscriber stations and is responsive to a control message received in accordance with the second message protocol to transmit the control message to the network controller in accordance with the first message protocol. The first message protocol is a balanced protocol with the communications protocol converter or the network controller able to initiate an exchange of information. The second message protocol is a master-slave protocol with the communications protocol interface acting as master. The second control message protocol operates over central station bus for communicating with at least one network element in the central station.

10 Claims, 14 Drawing Sheets

CONTROL MESSAGE TRANSMISSION IN TELECOMMUNICATIONS SYSTEMS

TECHNICAL FIELD OF THE INVENTION

The present invention relates to message transmission over a control bus.

BACKGROUND OF THE INVENTION

The invention finds particular, but not exclusive application to control message transmission over a bus between controller in a central station of a telecommunications network and network elements in the central station.

The environment in which the invention finds particular application is a real-time environment where reliable and rapid message communication is essential. It is desirable to reduce the bandwidth needed for the message transfer operations, with a minimum of time required for communication overheads, such as bus contention issues.

SUMMARY OF THE INVENTION

In accordance with the present invention, there is provided a communications protocol interface for a telecommunications network, the telecommunications network comprising a network controller, a central station controlled by the network controller in accordance with a first message protocol and a plurality of subscriber stations in wireless communication with the central station, control messages being transmitted between the central station and the subscriber stations in accordance with a second message protocol, wherein the communications protocol interface is arranged at the central station and is responsive to a control message received from the network controller in accordance with the first message protocol to transmit the control message in accordance with the second message protocol, and is responsive to a control message received in accordance with the second message protocol to transmit the control message to the network controller in accordance with the first message protocol.

The use of a first control message protocol for control message transmission between the network controller and central station and a second control message protocol for control message transmission between the central station and the subscriber stations enables each message protocol to be optimised for the bandwidth and transmission media available. A multi-level protocol is preferably employed to facilitate protocol management.

Preferably, the first message protocol is a balanced protocol with the communications protocol converter or the network controller able to initiate an exchange of information. An RS232 interface protocol is preferably employed for communicating with the network controller.

Preferably also, the second message protocol is a master-slave protocol with the communications protocol interface acting as master.

Preferably, also, the communications protocol interface comprises a central station bus interface for communicating with at least one network element in the central station in accordance with the second message protocol.

Preferably the communications protocol interface is arranged to communicate with the subscriber terminals via the at least one network element in the central station in accordance with the second message protocol.

The communications protocol interface preferably comprises an interface processor (e.g., a microprocessor) for converting between the first and second control message protocols.

More preferably, the communications protocol interface comprises a second interface processor (e.g., a microcontroller), the first interface processor interfacing with the first message protocol, and the second processor interfacing with the second message protocol.

Preferably, the communications protocol interface comprises a shelf controller on a modem shelf in the central station.

The invention also provides a central station comprising a communications protocol interface as described above.

At least one network element (e.g, a modem card or a tributary card or an analogue card for a modem shelf) in the central station preferably communicates with the communications protocol interface in accordance with the second message protocol.

The central station preferably comprises an internal bus interconnecting the communications protocol interface and the network elements, wherein the communications protocol interface operates as a busmaster on the bus and each of the network elements operate as a slave on the bus.

The invention further provides a telecommunications network comprising a network controller, a central station as described above, the central station being controlled by the network controller in accordance with a first message protocol, and a plurality of subscriber stations in wireless communication with the central station, control messages being transmitted between the central station and the subscriber stations in accordance with a second message protocol.

BRIEF DESCRIPTION OF THE DRAWINGS

An embodiment of the invention will be described hereinafter, by way of example only, with reference to the accompanying drawings in which like reference signs are used for like features and in which.

DETAILED DESCRIPTION OF THE INVENTION

Figure 1:
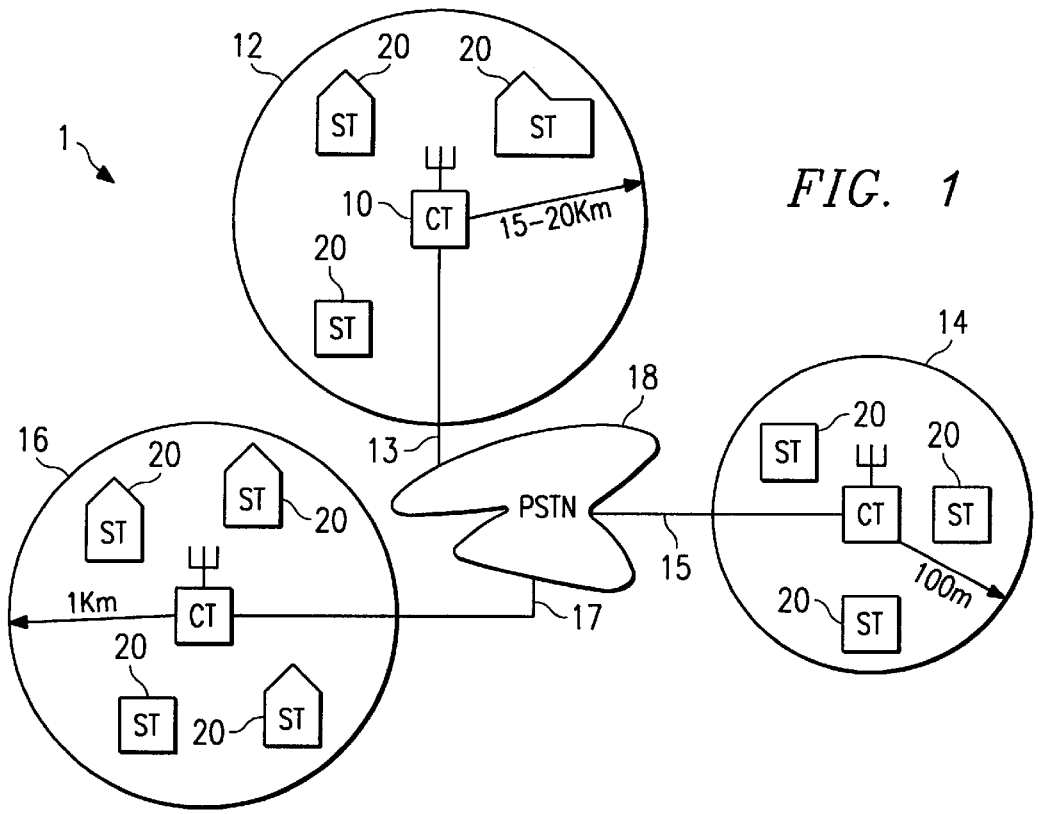
FIG. 1 is a schematic overview of an example of a wireless telecommunications system in which an example of the present invention is included.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where is there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 1 is based on providing fixed microwave links between subscriber terminals 20 at fixed locations within a service area (e.g., 12, 14, 16) and the central terminal 10 for that service area. In a preferred embodiment each subscriber terminal 20 is provided with a permanent fixed access link to its central terminal 10. However, in alternative embodiments demand-based access could be provided, so that the number of subscribers which can be serviced exceeds the number of telecommunications links which can currently be active.

Figure 2:
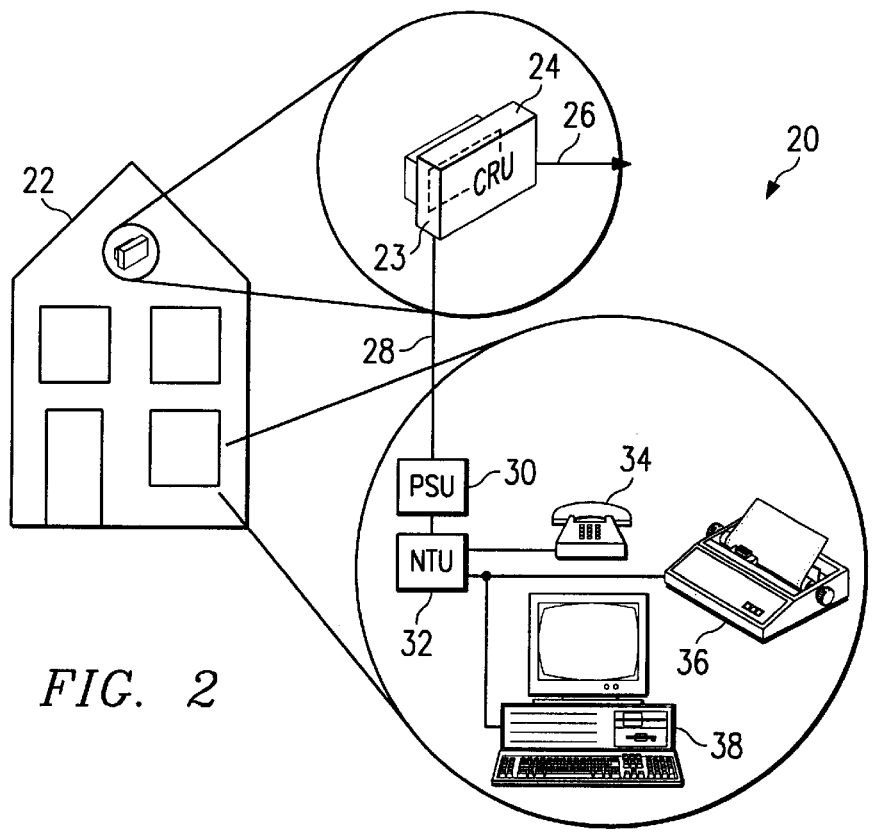
FIG. 2 is a schematic illustration of an example of a subscriber terminal of the telecommunications system of FIG. 1.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected to via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 preferably supports either a single or a dual line, so that two subscriber lines could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

Figure 3:
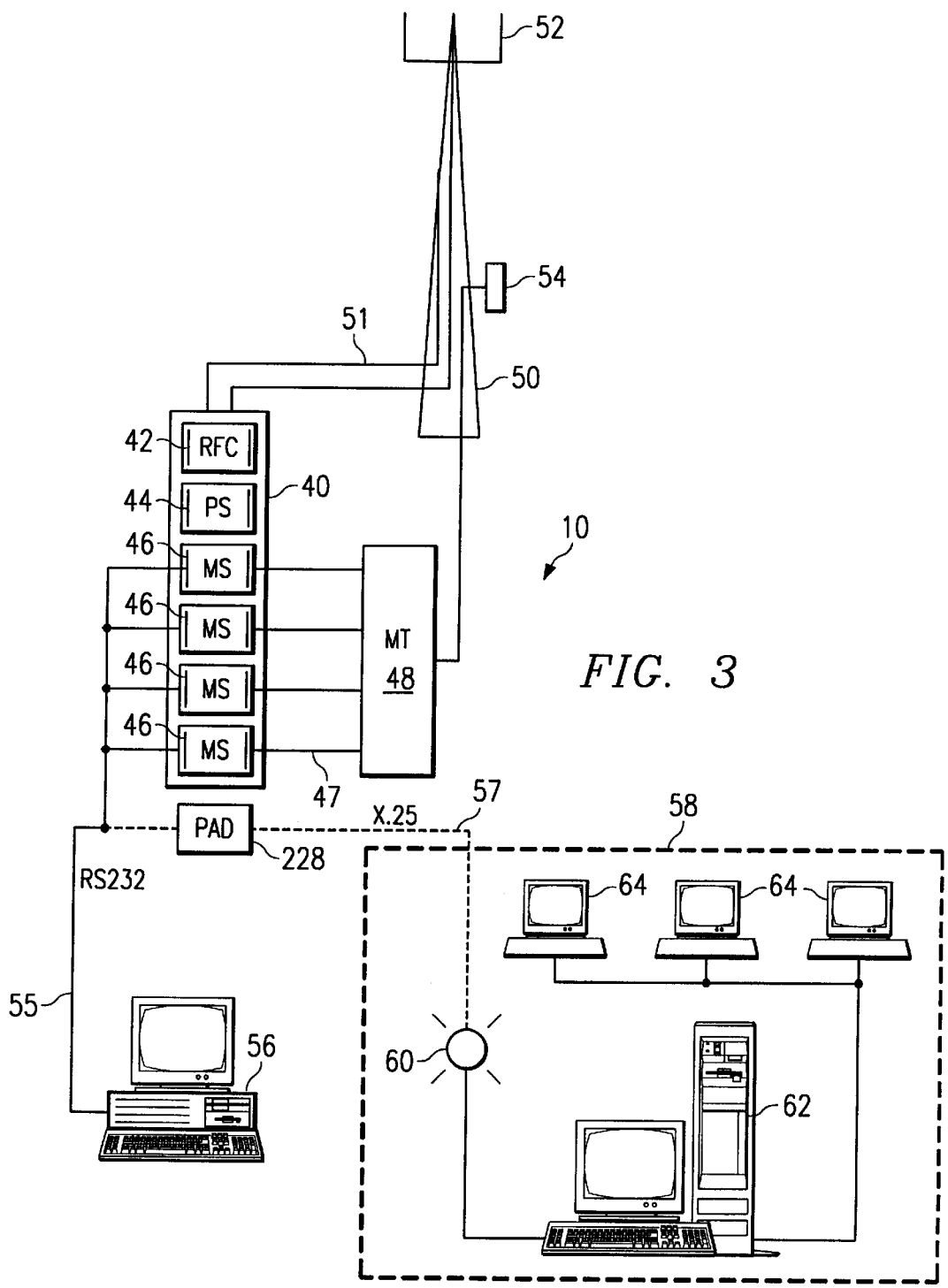
FIG. 3 is a schematic illustration of an example of a central terminal of the telecommunications system of FIG. 1.

FIG. 3 is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the four modem shelves 46 to operate in parallel. It combines and amplifies the power of four transmit signals, each from a respective one of the four modem shelves, and amplifies and splits received signals four way so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, typically an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

A personal computer, workstation or the like can be provided as a site controller (SC) 56 for supporting the central terminal 10. The site controller 56 can be connected to each modem shelf of the central terminal 10 via, for example, RS232 connections 55. The site controller 56 can then provide support functions such as the localisation of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 is based around a powerful workstation 62 and can include a number of computer terminals 64 for network engineers and control personnel.

Figure 3A:
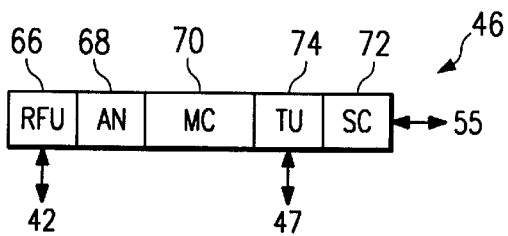
FIG. 3A is a schematic illustration of a modem shelf of a central terminal of the telecommunications system of FIG. 1.

FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of 15 transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This includes ½ rate convolution coding and ×16 spreading with CDMA codes on the transmit signals, and synchronisation recovery, de-spreading and error correction on the receive signals. Each modem card 70 in the present example has two modems, each modem supporting one subscriber link (or two lines) to a subscriber terminal 20. Thus, with two modems per card and 8 modems per modem shelf, each modem shelf could support 16 possible subscriber links. However, in order to incorporate redundancy so that a modem may be substituted in a subscriber link when a fault occurs, only up to 15 subscriber links are preferably supported by a single modem shelf 46. The 16th modem is then used as a spare which can be switched in if a failure of one of the other 15 modems occurs. The modem cards 70 are connected to the tributary unit (TU) 74 which terminates the connection to the host public switched telephone network 18 (e.g., via one of the lines 47) and handles the signalling of telephony information to, for example, up to 15 subscriber terminals (each via a respective one of 15 of the 16 modems).

Figure 4:
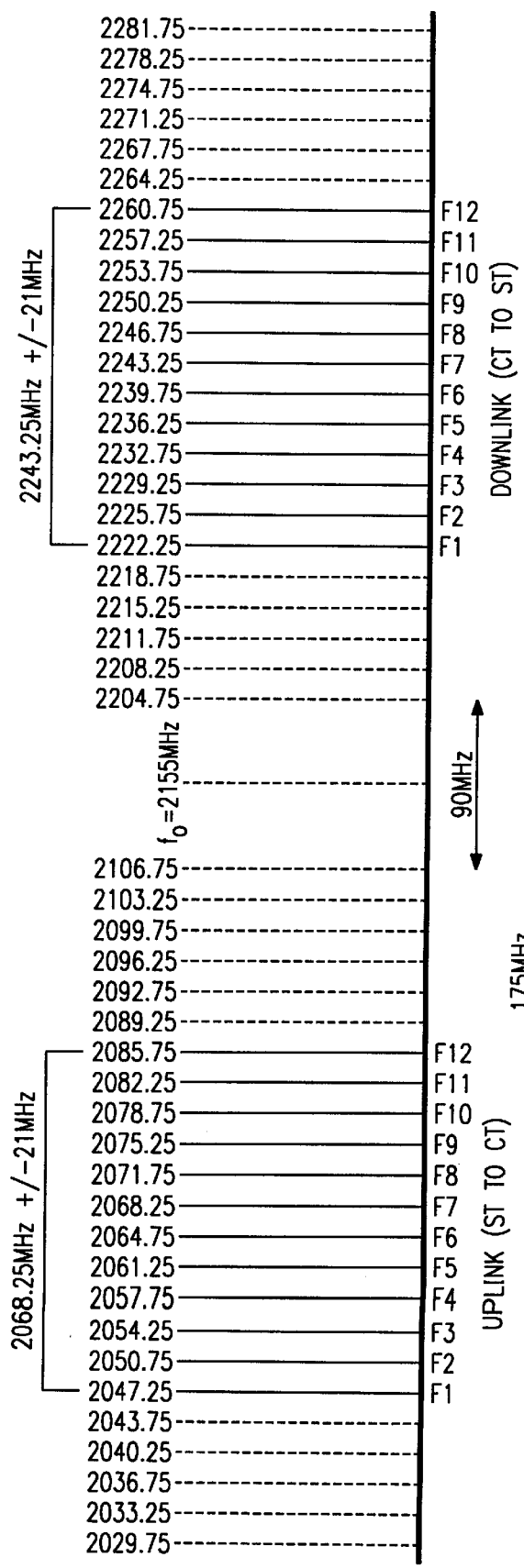
FIG. 4 is an illustration of an example of a frequency plan for the telecommunications system of FIG. 1.

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F.701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centred about 2155 MHz. The spacing between the receive and transmit channels exceeds the required minimum spacing of 70 MHz.

In the present example, as mentioned above, each modem shelf will support 1 frequency channel (i.e. one uplink frequency plus the corresponding downlink frequency). Up to 15 subscriber links may be supported on one frequency channel, as will be explained later. Thus, in the present embodiment, each central terminal 10 can support 60 links, or 120 lines.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10.

Figure 5A:
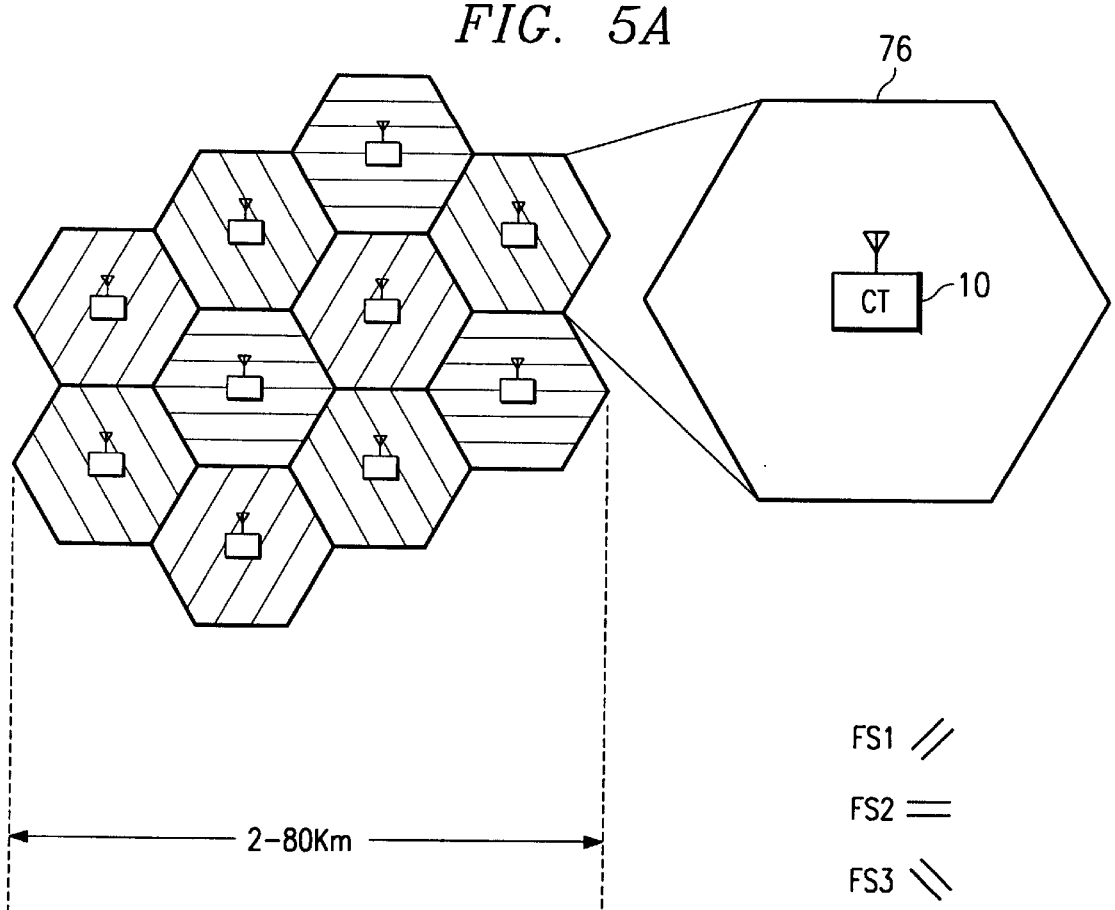
FIGS. 5A and 5B are schematic diagrams illustrating possible configurations for cells for the telecommunications system of FIG. 1.

FIG. 5A illustrates one cellular type arrangement of the frequencies to mitigate interference problems between adjacent central terminals 10. In the arrangement illustrated in FIG. 5A, the hatch lines for the cells 76 illustrate a frequency set (FS) for the cells. By selecting three frequency sets (e.g., where: FS1=F1, F4, F7, F10; FS2=F2, F5, F8, F11; FS3=F3, F6, F9, F12), and arranging that immediately adjacent cells do not use the same frequency set (see, for example, the arrangement shown in FIG. 5A), it is possible to provide an array of fixed assignment omnidirectional cells where interference between nearby cells can be avoided. The transmitter power of each central terminal 10 is set such that transmissions do not extend as far as the nearest cell which is using the same frequency set. Thus each central terminal 10 can use the four frequency pairs (for the uplink and downlink, respectively) within its cell, each modem shelf in the central terminal 10 being associated with a respective RF channel (channel frequency pair).

Figure 5B:
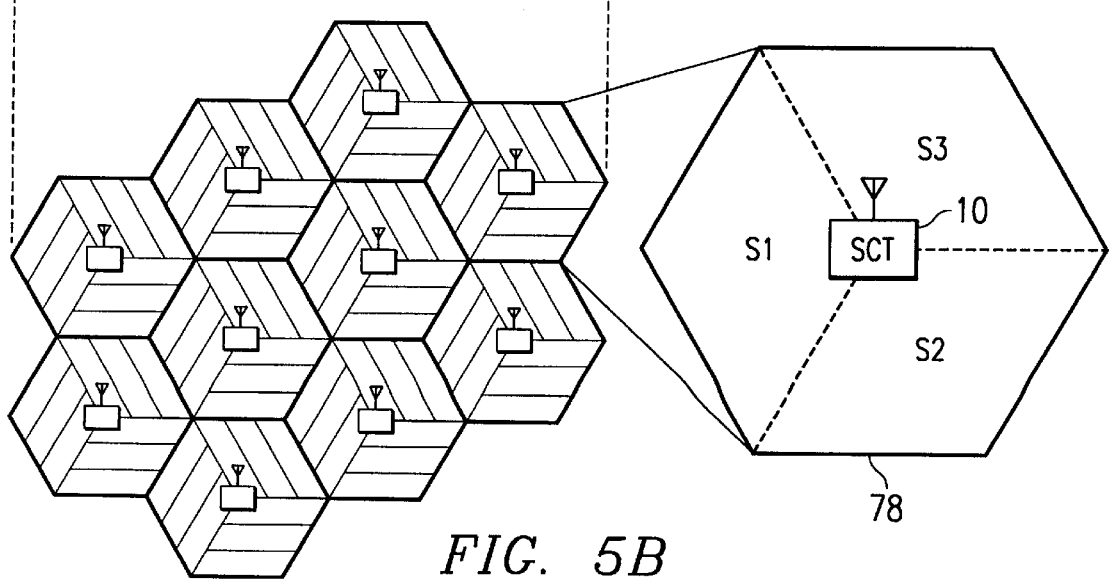

With each modem shelf supporting one channel frequency (with 15 subscriber links per channel frequency) and four modem shelves, each central terminal 10 will support 60 subscriber links (i.e., 120 lines). The 10 cell arrangement in FIG. 5A can therefore support up to 600 ISDN links or 1200 analogue lines, for example. FIG. 5B illustrates a cellular type arrangement employing sectored cells to mitigate problems between adjacent central terminals 10. As with FIG. 5A, the different type of hatch lines in FIG. 5B illustrate different frequency sets. As in FIG. 5A, FIG. 5B represents three frequency sets (e.g., where: FS1=F1, F4, F7, F10; FS2=F2, F5, F8, F11; FS3=F3, F6, F9, F12). However, in FIG. 5B the cells are sectored by using a sectored central terminal (SCT) 13 which includes three central terminals 10, one for each sector S1, S2 and S3, with the transmissions for each of the three central terminals 10 being directed to the appropriate sector among S1, S2 and S3. This enables the number of subscribers per cell to be increased three fold, while still providing permanent fixed access for each subscriber terminal 20.

A seven cell repeat pattern is used such that for a cell operating on a given frequency, all six adjacent cells operating on the same frequency are allowed unique PN codes. This prevents adjacent cells from inadvertently decoding data.

Figure 6:
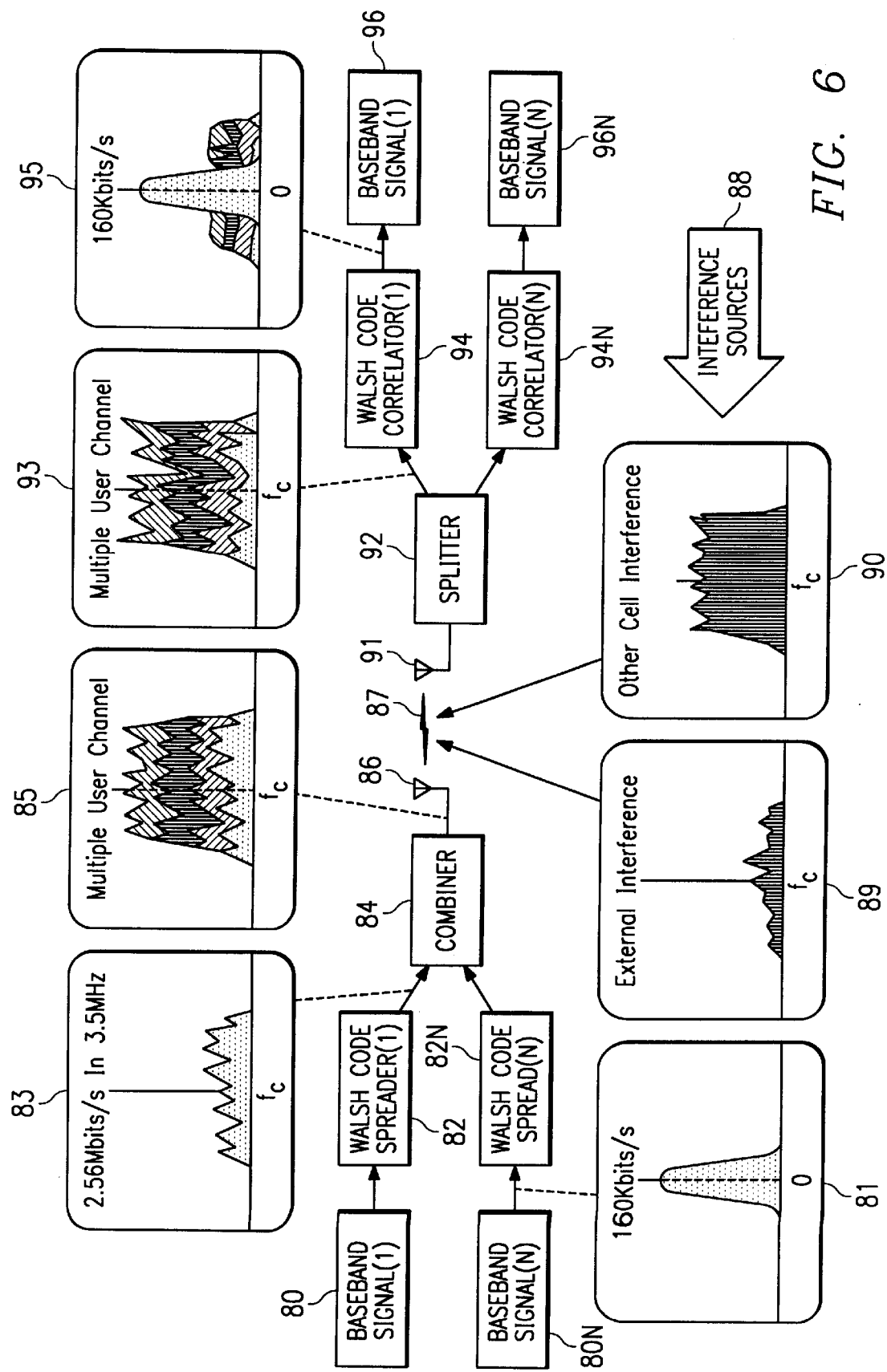
FIG. 6 is a schematic diagram illustrating aspects of a code division multiplex system for the telecommunications system of FIG. 1.

As mentioned above, each channel frequency can support 15 subscriber links. In this example, this is achieved using by multiplexing signals using a Code Division Multiplexed Access (CDMA) technique. FIG. 6 gives a schematic overview of CDMA encoding and decoding.

In order to encode a CDMA signal, base band signals, for example the user signals for each respective subscriber link, are encoded at 80–80N into a 160 ksymbols/sec baseband signal where each symbol represents 2 data bits (see, for example the signal represented at 81). This signal is then spread by a factor of 16 using a respective Walsh pseudo random noise (PN) code spreading function 82–82N to generate signals at an effective chip rate of 2.56 Msymbols/sec in 3.5 MHz. The signals for respective subscriber links are then combined and converted to radio frequency (RF) to give multiple user channel signals (e.g., 85) for transmission from the transmitting antenna 86.

During transmission, a transmitted signal will be subjected to interference sources 88, including external interference 89 and interference from other channels 90. Accordingly, by the time the CDMA signal is received at the receiving antenna 91, the multiple user channel signals may be distorted as is represented at 93.

In order to decode the signals for a given subscriber link from the received multiple user channel, a Walsh correlator 94–94N uses the same pseudo random noise (PN) code that was used for the encoding for each subscriber link to extract a signal (e.g, as represented at 95) for the respective received baseband signal 96–96N. It will be noted that the received signal will include some residual noise. However, unwanted noise can be removed using a low pass filter.

The key to CDMA is the application of orthogonal codes that allow the multiple user signals to be transmitted and received on the same frequency at the same time. To avoid the noise floor rising during spreading of the signals using PN codes as the number of user signals increases, Rademacher-Walsh codes are used to encode the spread user signals. Once the bit stream is orthogonally isolated using the Walsh codes, the signals for respective subscriber links do not interfere with each other.

Walsh codes are a mathematical set of sequences that have the function of "orthonormality". In other words, if any Walsh code is multiplied by any other Walsh code, the results are zero.

The following example will illustrate this using a four bit spreading code for ease of illustration, rather than the 16 bit spreading code preferred in practice.

| Incoming User Bit Stream | PN Code Spreading (×4) | Application of Walsh Codes | Transmit Code |
|---|---|---|---|
| '1' | 1011 | 0000 | 0000 |
| '0' | 1010 | 1100 | 1000 |
|  |  |  | 0010 |
| '1' | 0110 | 1010 | 0100 |
| '1' | 0111 | 1001 | 1110 |

Figure 7:
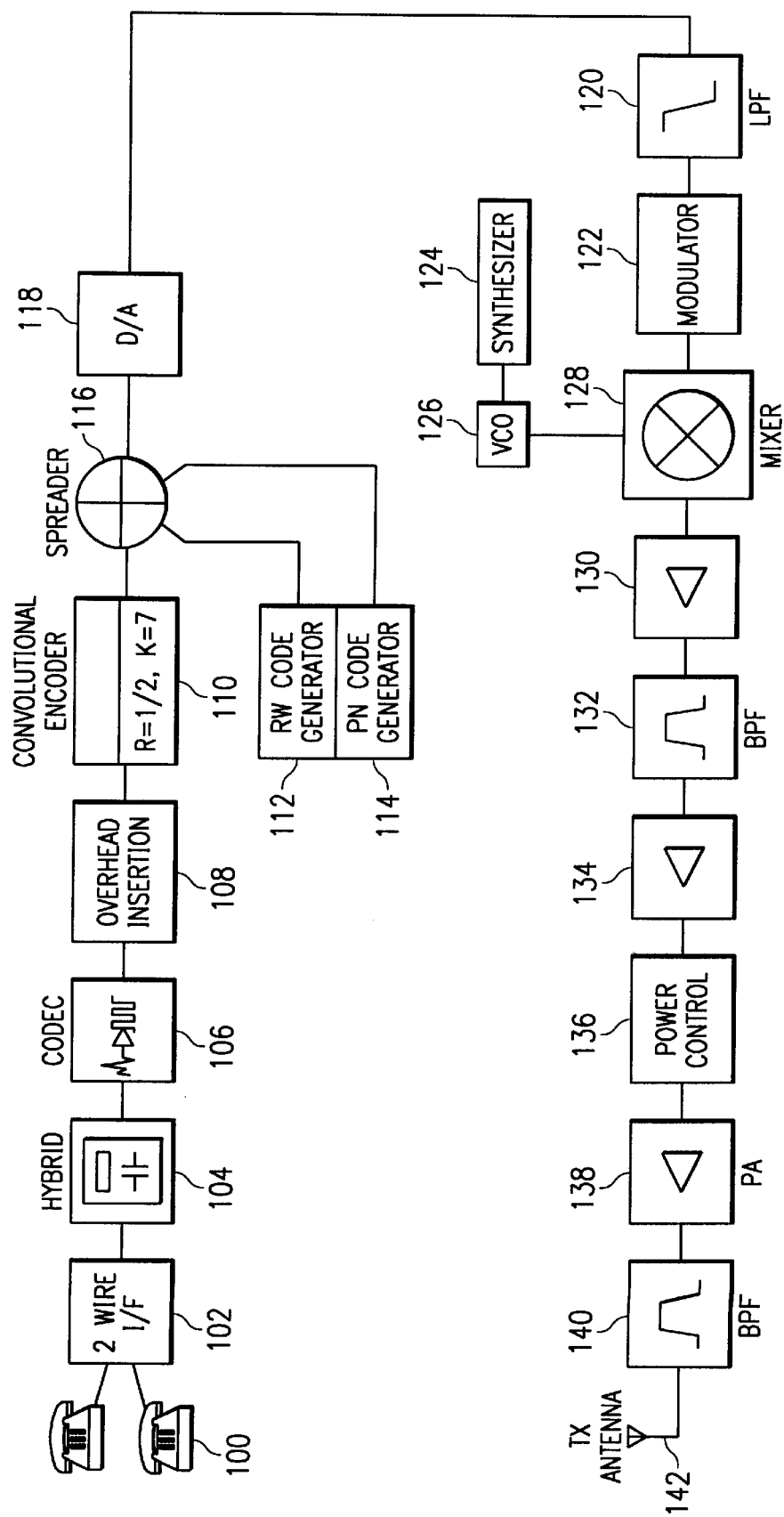
FIG. 7 is a schematic diagram illustrating signal transmission processing stages for the telecommunications system of FIG. 1.

FIG. 7 is a schematic diagram illustrating signal transmission processing stages as configured in a subscriber terminal 20 in the telecommunications system of FIG. 1. The central terminal is also configured to perform equivalent signal transmission processing. In FIG. 7, an analogue signal from one of a pair of telephones is passed via a two-wire interface 102 to a hybrid audio processing circuit 104 and then via a codec 106 to produce a digital signal into which an overhead channel including control information is inserted at 108. The resulting signal is processed by a convolutional encoder 110 before being passed to a spreader 116 to which the Radermacher-Walsh and PN codes are applied by a RW code generator 112 and PN Code generator 114, respectively. The resulting signals are passed via a digital to analogue converter 118. The digital to analogue converter 118 shapes the digital samples into an analogue waveform and provides a stage of baseband power control. The signals are then passed to a low pass filter 120 to be modulated in a modulator 122. The modulated signal from the modulator 122 is mixed with a signal generated by a voltage controlled oscillator 126 which is responsive to a synthesizer 160. The output of the mixer 128 is then amplified in a low noise amplifier 130 before being passed via a band pass filter 132. The output of the band pass filter 132 is further amplified in a further low noise amplifier 134, before being passed to power control circuitry 136. The output of the power control circuitry is further amplified in a further low noise amplifier 138 before being passed via a further band pass filter 140 and transmitted from the transmission antenna 142.

Figure 8:
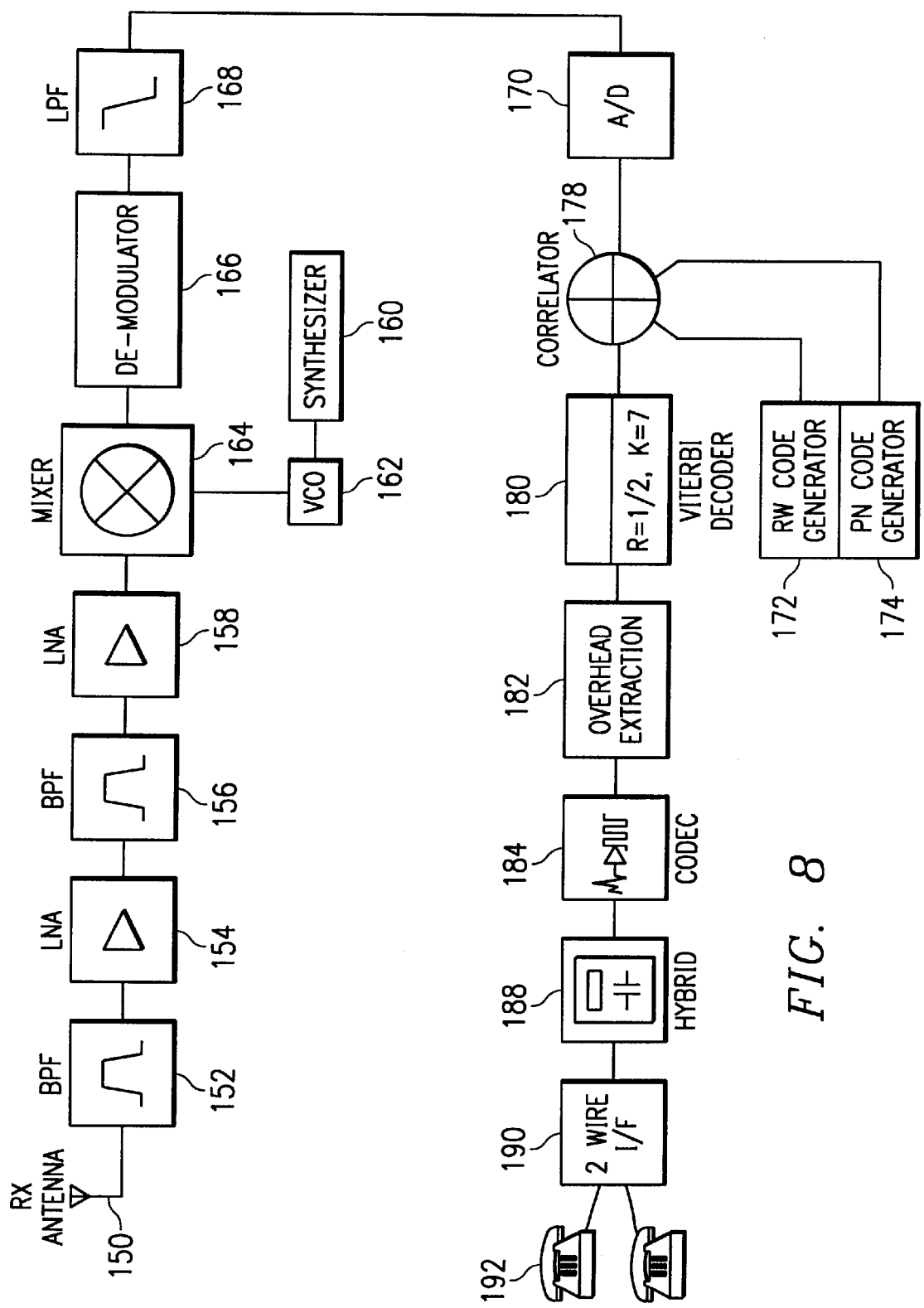
FIG. 8 is a schematic diagram illustrating signal reception processing stages for the telecommunications system of FIG. 1.

FIG. 8 is a schematic diagram illustrating the equivalent signal reception processing stages as configured in a subscriber terminal 20 in the telecommunications system of FIG. 1. The central terminal is also configured to perform equivalent signal reception processing. In FIG. 8, signals received at a receiving antenna 150 are passed via a band pass filter 152 before being amplified in a low noise amplifier 154. The output of the amplifier 154 is then passed via a further band pass filter 156 before being further amplified by a further low noise amplifier 158. The output of the amplifier 158 is then passed to a mixer 164 where it is mixed with a signal generated by a voltage controlled oscillator 162 which is responsive to a synthesizer 160. The output of the mixer 164 is then passed via the de-modulator 166 and a low pass filter 168 before being passed to an analogue to digital converter 170. The digital output of the A/D converter 170 is then passed to a correlator 178, to which the same Radermacher-Walsh and PN codes used during transmission are applied by a RW code generator 172 (corresponding to the RW code generator 112) and a PN code generator 174 (corresponding to PN code generator 114), respectively. The output of the correlator is applied to a Viterbi decoder 180. The output of the Viterbi decoder 180 is then passed to an overhead extractor 182 for extracting the overhead channel information. The output of the overhead extractor 182 is then passed via a codec 184 and a hybrid circuit 188 to a two wire interface 190 where the resulting analogue signals are passed to a selected telephone 192.

Figure 9:
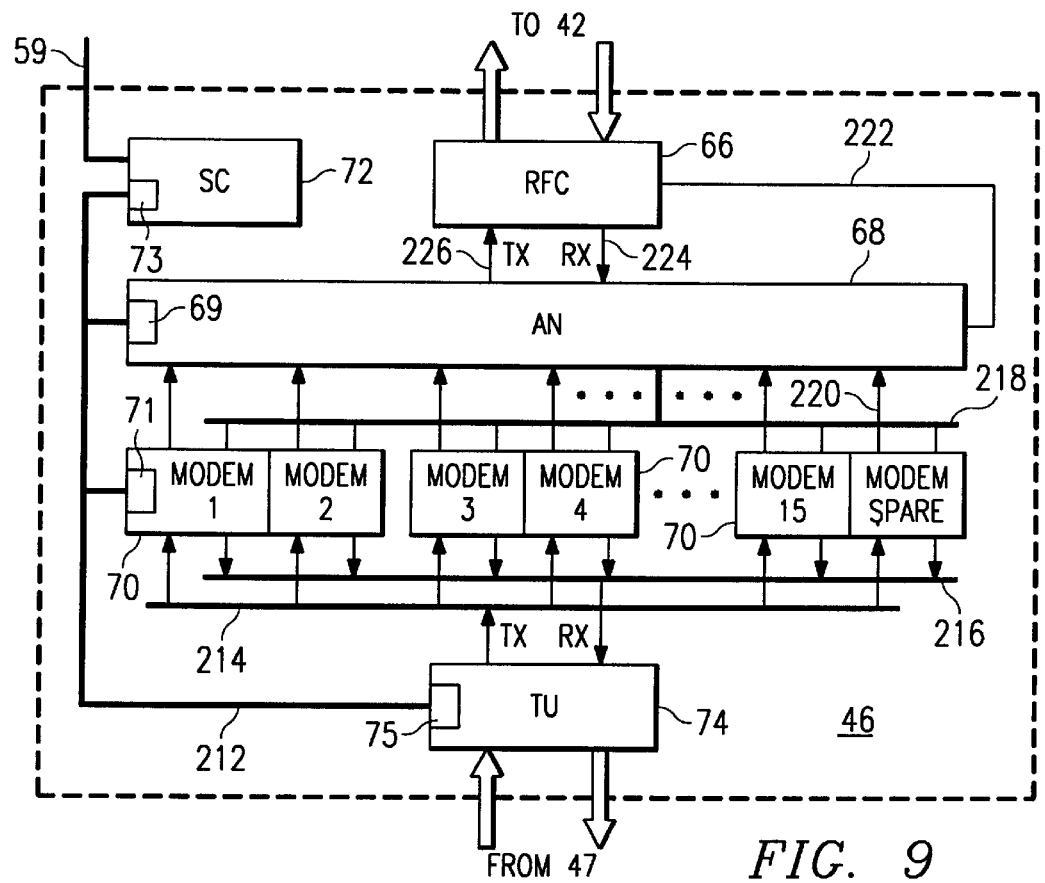
FIG. 9 is a schematic diagram illustrating in more detail the configuration of the modem shelf of FIG. 3A.

FIG. 9 is a schematic diagram illustrating in more detail the configuration of one of the modem shelves 46.

The shelf controller 72 manages the operation of the whole of the modem shelf and its daughter network sub-elements (NSEs). The shelf controller (SC) 72 is provided with a RS232 serial port 59 for connection to a site controller or to a pad for connection to a data network such as an X.25 data network. The shelf controller communicates control and data information via a backplane asynchronous bus 212 directly with the analogue card (AN) 68, the tributary unit card (TU) 74 and the modem cards (MC) 70. Other network sub-elements are connected via the modem cards. In a fully populated rack there will be four shelf controllers, one on each modem shelf. These four shelf controllers are configured to share the control of network service elements on other cards in the rack. The network service elements on the RF combiner shelf 42 are connected to the shelf controller backplane bus on each of the modem shelves. The shelf controller includes a master communications interface 73 for performing the communications functions mentioned above and other control functions. Each of the tributary card 74, the analogue card 68 and each modem card 70 includes a respective slave communications interface 74, 69 and 71, which manages the communications with the shelf controller 72. The RF card 66 is controlled from the analogue card 68, which is configured to provide the necessary control functions via the control path 222.

Also shown in FIG. 9 are the signal paths from an interface to the public switched telephone network (e.g via lines 47 in FIG. 3) and the interface to an RF combiner shelf 42.

The tributary unit 74 terminates the connection to the host public switched telephone network and handles the processing of telephony information for up to 15 subscriber terminals (up to 30 calls). The tributary unit 74 is 'on-line' in that it directly processes calls. The tributary unit 74 is also connected to a 2 Mb/s time-multiplexed (timeslot) transmit bus 214 and 2 Mb/s time-multiplexed (timeslot) receive bus 216 for transmit and receive calls, respectively.

The modems (1–15) on the modem cards 70 perform baseband signal processing of the transmit and receive signals including the convolution coding and spreading functions on the transmit signals, and the synchronisation recovery, de-spreading and error correction functions on the receive signals, as described earlier. Each modem is connected to the tributary unit 74 via the transmit and receive buses 214 and 216, and to the analogue card 68 via a dedicated connection 220 to one of a number of ports on the analogue card and via a digital CDMA RCV bus 218. Each of these dedicated connections includes multiplexed I, Q and control transmit paths.

The analogue card 68 performs A-D/D-A conversions, baseband filtering and vector summation of the 15 transmit signals from the modem cards. The analogue card 68 also scales the transmit signal power level according to high or low power levels. It is connected to the modem cards via the dedicated connections 220 and the digital CDMA RCV bus 218.

The RF card 66 generates the modulated transmit RF signals (at medium power level) and recovers and amplifies the baseband RF signal from the subscriber terminals 20. The RF card is 'on-line' in that it passes up to 30 calls simultaneously via the 15 available links, all on the same RF carrier. The RF card is connected to the analogue card via transmit and receive paths 226 and 224, respectively. The RF card is also connected to power amplifiers of the RF combiner shelf on the transmit side and to a low noise amplifier on the receive side. The power amplifiers (not shown) in the RF combiner shelf amplify the medium power output of the RF card 66 to an appropriate transmit power plus an amount to cover losses during signal combination and in the antenna feeder cable for the transmit signal. The low noise amplifier (not shown) is a low signal amplifier for overcoming losses in the antenna feeder etc. for the receive signal. The transmit carrier modulation is performed by the RF card 66 using an 'IQ modulator' at intermediate frequency and a single conversion to RF. The receive output of the RF card is at baseband in 'IQ' format as per the transmit input to the RF card.

Figure 10:
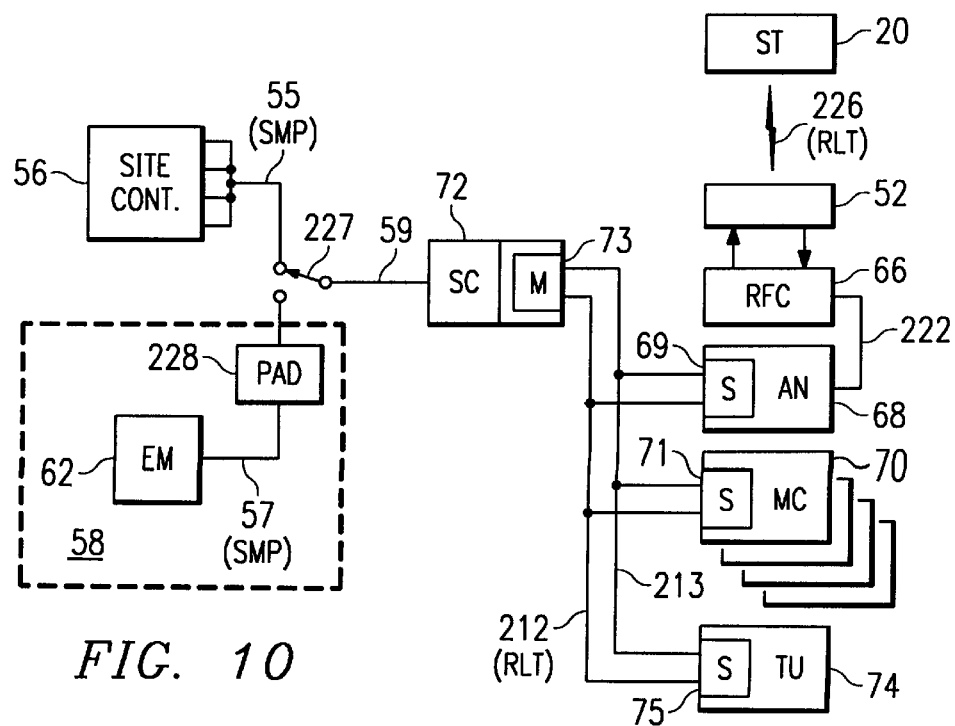
FIG. 10 is a schematic block diagram illustrating control protocols for the telecommunication system of FIG. 1.

FIG. 10 is a schematic block diagram illustrating an example of various control protocols used for the transmission of control information between different parts of an example of a telecommunications system in accordance with the invention. It should be noted that FIG. 10 is directed to the control signal paths, and accordingly, the telephone call signal paths are not included. Many of the features of FIG. 10 have already been described above, and in this case the same reference numerals are used as before. Accordingly, these features will not be described again in detail.

A first protocol, called the Sub-system Management Processor (SMP) protocol, is used for communications between the shelf controller 72 and a site controller 56, or element manager 58, via lines 59 and 55, or 59 and 57, respectively. The first protocol is a balanced protocol with either party to a communication being able to initiate an exchange of information. The first protocol and the types of message which can be sent will be described in more detail below. As mentioned above, the shelf controller 72 is provided with an RS232 serial output for connection to a site controller 56. Accordingly, if a connection is provided instead to an element controller 62, represented schematically by the switch 227, a pad 228 for connection to an X.25 line, or the like, is used to convert between RS232 format and X.25 format.

A second protocol, called the Radio Link Termination (RLT) protocol, is used for passing control and data information via the control 212 and data 213 buses on the modem shelf. In addition, it should be noted that the same protocol is valid on the radio link 226 between the antenna 52 of the central terminal and the subscriber terminal(s) 20.

The second protocol is an unbalanced protocol with the microprocessor 73 in the shelf controller 72 acting as a busmaster (M) and the microcontrollers 69, 71 and 75 on the analogue card 68, the modem cards 70 and the tributary unit 74 acting as slaves.

The first protocol and the message structure will now be described in more detail.

The first protocol is used for information exchange in both directions between the site controller 56, or element controller 58 if connected instead, and a selected modem shelf controller 73. In the following description of the first protocol, the term management processor will be used for ease of reference to be either a site controller or an element manager, as the first message protocol is the same whether a site controller 56 is connected to a shelf controller 72 via an RS232 link 55, or an element manager 58 is connected to a shelf controller via an X.25 link 57 and the pad 228.

On initially establishing a connection between the management processor and the shelf controller, and preferably also at intervals during operation, an authentication process is undertaken. The authentication process is advantageous to stop potential intruders from extracting, distorting and corrupting the information within the telecommunications system. The details of the authentication process do not form part of the instant invention and will therefore not be described herein. However, it will be appreciated that any number of conventional authentication processes could be employed using the identities (e.g., serial numbers) of various components, transaction numbers, etc.

When it is desired to establish a communication, a call set up sequence is employed. An example of a call set up procedure where an management processor (MP) initiates a call to a shelf controller (SC) includes:

| MP Action/Response | SC Action/Response |
|---|---|
| Set up call using SC address | --> Wait |
| Detect call setup address | <-- Set up call using MP |
| Check received MP address | |
| Drop call if incorrect | |
| Send 'authentication' message | --> Validate |
| 'authentication' message | |
| | Send 'authentication reply' |
| with SC | |
| | data and result of validation |

-continued

| MP Action/Response | SC Action/Response |
|---|---|
| Check validation result and validation false SC information. Drop call if information check is false | <-- Drop call if |

The first protocol is message based. Individual messages tend to be relatively short and are blocked for transmission within message packets. Each such packet, which is variable in length, can carry one or more messages, all of which must be the same size. The maximum packet size, excluding the packet header, is chosen in the present example to be 260 bytes. With the 260 byte maximum packet length, the packet may contain either one 256 byte message, thirteen 16 byte messages, thirty-two 4 byte messages or fifty-two 1 byte messages.

A packet consists of the following fields:

| SOP | Start of Packet | 3 bytes |
|---|---|---|
| CTRL | Control Byte | 1 byte |
| Messages | | variable |
| EOP | End of Packet | 3 bytes |
| CRC | Cyclic Redundancy Check | 2 bytes |

The purpose of the fields SOP, CTRL, EOP and CRC will now be explained in more detail.

SOP

This defines the start of a packet and is represented by 3 unique bytes, 'AA' hex followed by 'EE' hex followed by 'AA' hex (i.e., in binary 1010 1010 1110 1110 1010 1010). It will be noted that for each nibble the MSB is 1 and the LSB is 0.

CRTL

This defines the controls for the packet. The first two bits define the message size for the packet. The four possible sizes are as follows:

| Type 1 | '0 0' | 1 byte |
|---|---|---|
| Type 2 | '0 1' | 4 bytes |
| Type 3 | '1 0' | 16 bytes |
| Type 4 | '1 1' | 256 bytes |

The third bit defines the packet direction: '0' is from the management processor to the shelf controller and '1' from the shelf controller to the management processor.

The last five bits are used to identify a packet sequence number (PSN). The packet sequence number represents a window used for flow control. The sender may send a number of packets, up to the window size (or a smaller number (e.g., five) if this is pre-arranged before a packet exchange), before receiving a packet acknowledgement from the receiver. The acknowledgement advances the window and allows the sender to overwrite the packets acknowledged.

A packet (PSN=n) received out of sequence, or with an error after application of the CRC, leads to an acknowledgement for packet sequence number (n−1). The acknowledgement packet indicates whether a CRC error was found. All packets after the acknowledged one then have to be retransmitted to avoid the complication of selective retransmission.

From the values 0 . . . 31 which can be accommodated within the five bit sequence number, the value 0 is reserved for sequence number re-synchronisation (to be described later) so that the normal sequence numbers are 1, 2, 3, . . . 30, 31, 1, 2 . . . .

A maximum number of outstanding acknowledgement packets is defined as a number which must be less than half the number of valid sequence numbers. For purposes of illustration only, in examples to be described below, a window size of five is assumed. The receiver is arranged to recognise the concept of the 'previous' window (the last window length's worth of message packets from the current expected sequence number) and the 'next' window (the next window length's worth of message packets).

Acknowledgement packets do not have a sequence number as such, rather the sequence number field will always be set at zero, and are always sent singly (i.e., they are not packaged with other messages). Acknowledgement packets are not acknowledged themselves and are not subject to the window limit, they can be sent at any time.

The immediate re-transmission of packets may be requested by setting the top bit of the packet acknowledgement data byte. This causes any remaining unacknowledged packets to be immediately re-transmitted rather than waiting for a time-out. The meaning of the rest of the acknowledgement remains unchanged.

After start-up and sometimes during operation, it is necessary to re-synchronise the sequence numbers between the sender and the receiver. The special sequence number 0 is used for this purpose. The reception of the 0 sequence number resets the expected sequence number variable of the receiver. After the reset, it is no longer valid for packets from the previous window to be received until after the first acknowledgement has been sent.

The two message flow directions are completely independent. The state of the message flow from the management processor to the shelf controller is not allowed to affect the flow of messages in the other direction, and vice versa.

In the following, a number of examples of packet flow between a sender and receiver are illustrated. In the examples, a window size of five is chosen. This means that up to five packets may be sent without an acknowledgement. The receiver need not wait until five packets have been received, but can send an acknowledgement when it is convenient.

In the packet flow examples set out below, the sender is shown in the left column, the receiver in the right column. The arrows indicate the direction of packet flow.

EXAMPLE 1

Normal state (acknowledgement after five packets).

| 6 | --> | |
|---|---|---|
| 7 | --> | |
| 8 | --> | |
| 9 | --> | |
| 10 | --> | |
| | <-- | 10 |

EXAMPLE 2

A packet (not the first after an acknowledgement) is lost. The receiver acknowledges up to the packet before the missing one and packets after the missing one are discarded. The sender re-sends the remaining packets after a timeout. The receiver can then send the acknowledgement on recognising the missing packet.

|   |     |         |
|---|-----|---------|
| 6 | --> |         |
| 7 | --> |         |
| 8 | -\| |         |
| 9 | --> | ignored |
| 10| --> | ignored |
|   | <-- | 7       |
| Timeout ... | | |
| 8 | --> |         |
| 9 | --> |         |
| 10| --> |         |
|   | <-- | 10      |

EXAMPLE 3

The first packet after an acknowledgement is lost. In this case the receiver does not send an acknowledgement but waits for the packets to be re-sent in due course.

|   |     |         |
|---|-----|---------|
| 6 | -\| |         |
| 7 | --> | ignored |
| 8 | --> | ignored |
| 9 | --> | ignored |
| 10| --> | ignored |
| Timeout ... | | |
| 6 | --> |         |
| 7 | --> |         |
| 8 | --> |         |
| 9 | --> |         |
| 10| --> |         |
|   | <-- | 10      |

EXAMPLE 4

An acknowledgement is lost. In this case the receiver will get packets from the previous window which it had tried to acknowledge. The response is to resend the previous acknowledgement as soon as a packet from the previous window is received. It is possible that a plurality of acknowledgements will be sent as transmission is not instantaneous. The sender accounts for this and discards acknowledgements for packets for which acknowledgements have already been received.

|   |     |    |
|---|-----|----|
| 6 | --> |    |
| 7 | --> |    |
| 8 | --> |    |
| 9 | --> |    |
| 10| --> |    |
|   | \|- | 10 |
| Timeout ... | | |
| 6 | --> |    |
|   | <-- | 10 |

EXAMPLE 5

A spurious packet is received, which is neither from the previous nor the next window. The receiver ignores the packet. It may be due to corruption, in which case the packet will be treated as lost and one of the above scenarios will come into play. It may also be due to a loss of synchronisation. If this is the case, the sender will detect this due to lack of acknowledgements and will then retransmit all the outstanding packets starting with the special sequence number 0.

|   |     |        |
|---|-----|--------|
| 7 | --> |        |
| 8 | --> |        |
| 9 | --> |        |
| 10| --> |        |
|   | <-- | 10     |
| 5 | --> | ignore |

EOP

This defines the end of the packet and is represented by three unique bytes, 'EE' hex followed by 'AA' hex followed by 'EE' hex (i.e., in binary 1110 1110 1010 1010 1110 1110). The initial combination of bytes of the end of packet sequence should start with a byte sequence which is invalid for data in the message fields. It will be noted that for each nibble the MSB is 1 and the LSB is 0.

The use of the end of packet field avoids the need to identify the total length of packets by indicating the number of bytes or the number of messages of a given size, for example.

CRC

This is used to detect errors in both the packet header and the messages. A CRC error leads to the transmission of an acknowledgement for the last packet correctly received.

The structure of the message records will now be described in more detail. Each message record consists of a four byte header followed by the message data field.

The message header consists of: a message control byte; a sub-address byte; a message ID byte; and a task reference number byte.

One bit in the message control byte (e.g., the MSB) defines the type of message (e.g, '1' for command, '0' for report) and is used in combination with the message ID to define the message processing required. The remaining 7 bits of the message control byte define an element address to which the message refers (e.g, the address of a modem to which a message is directed).

The sub-address byte is a sub-address field within the element addressed by the message control byte.

The message ID byte defines the identity (equivalent to a command code) of the message.

The transaction identifier byte can be used to match up commands to a shelf controller with replies from it.

For any message capable of exceeding 256 bytes, the first byte of the data field contains a message sequence number (MSN) which is set to zero for each new message sent and is incremented for each 256-byte fragment (i.e. packet sending that message). The first data byte also contains a 'more' bit to indicate that the current package is not the last one for that message. The bit is set to zero for the last message fragment sent. If such a message is received out of sequence, the receiver sends a packet acknowledgement for the last packet correctly received. The sender will then resend all packets following the one which has been acknowledged.

All reports relating to specific events will be sent with an event sequence number (ESN) to distinguish them from other events. An event clear message can be used to identify an event to be cleared.

The length of the data field for a message is given in the packet control byte. All messages in a packet have the same length. In the present example the data field can be 1, 4, 16 or 156 bytes in length.

Figure 11:
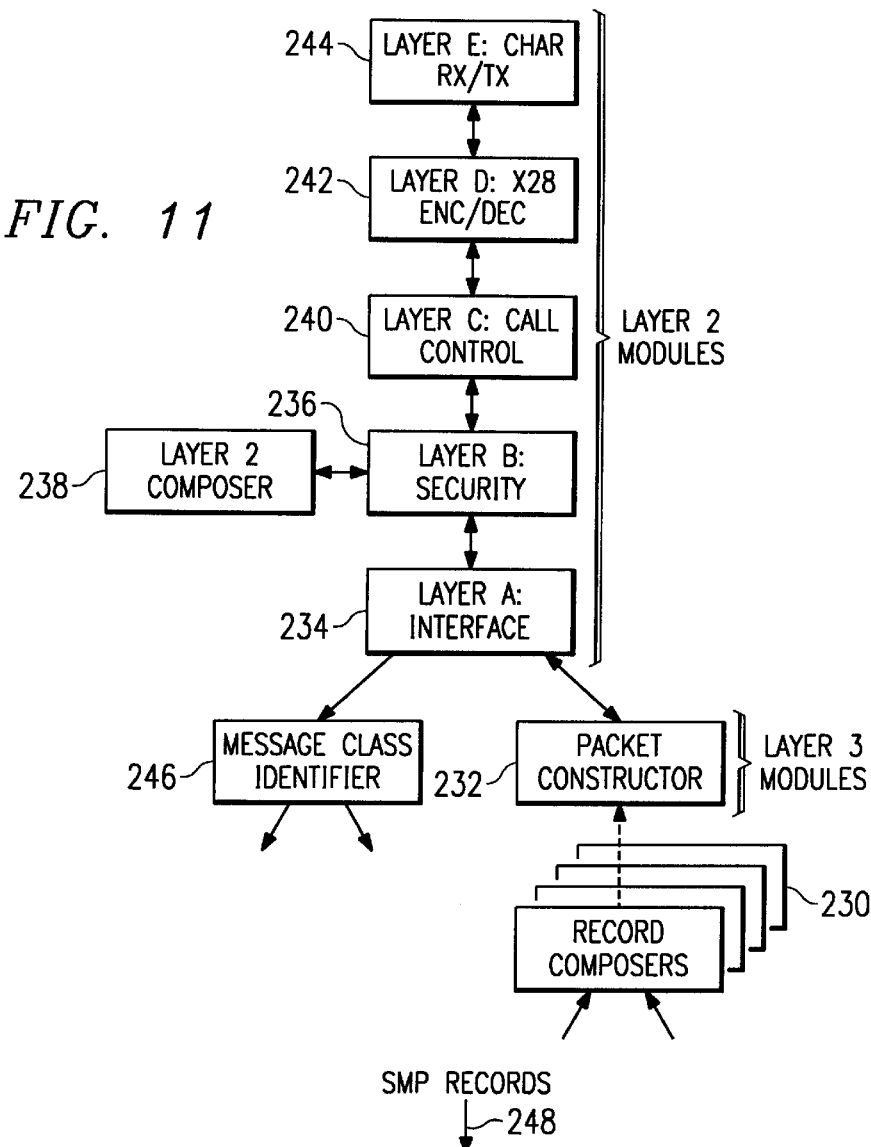
FIG. 11 is a schematic block diagram illustrating message handling modules for passing control messages between a site controller or element manager and a modem shelf controller in the telecommunication system of FIG. 1.

FIG. 11 is a schematic block diagram illustrating the architecture of the message handling modules which are provided in the management processor and the shelf controller for constructing, sending and receiving messages.

The message handling modules are described with reference to FIG. 11 for the situation where they are located in a shelf controller, which is communicating with an element controller via an X.28 format line to a pad and from there to the element controller via an X.25 format line. The same structure is used where there is an RS232 connection (i.e., an X.28 format line) directly to a site controller. Similarly, the same basic structure is employed in a site controller or element controller at the other end of the line. The processes performed in the message handling modules can be implemented on suitable processing hardware including, as appropriate, one or more microprocessors and/or special purpose hardware.

The message handling modules, and consequently the protocol can be thought of as having a plurality of different layers. The layers A–E illustrated in FIG. 11 form part of a layer 2 protocol.

In FIG. 11, layer E 244 is responsible for transmitting and receiving strings of characters representing messages to and from the transmission link. The transmitter is responsible for duplicating characters in message packets. The receiver contains a state machine that assembles incoming characters into messages. This layer performs particular functions, which are: initialise the layer, transmit a message, receive a message and accumulate messages. The last of these functions is responsible for accumulating bytes into messages. It handles both communications with the pad and command messages as well as message packets. Bytes that cannot be fitted into a message are discarded.

Figure 13:
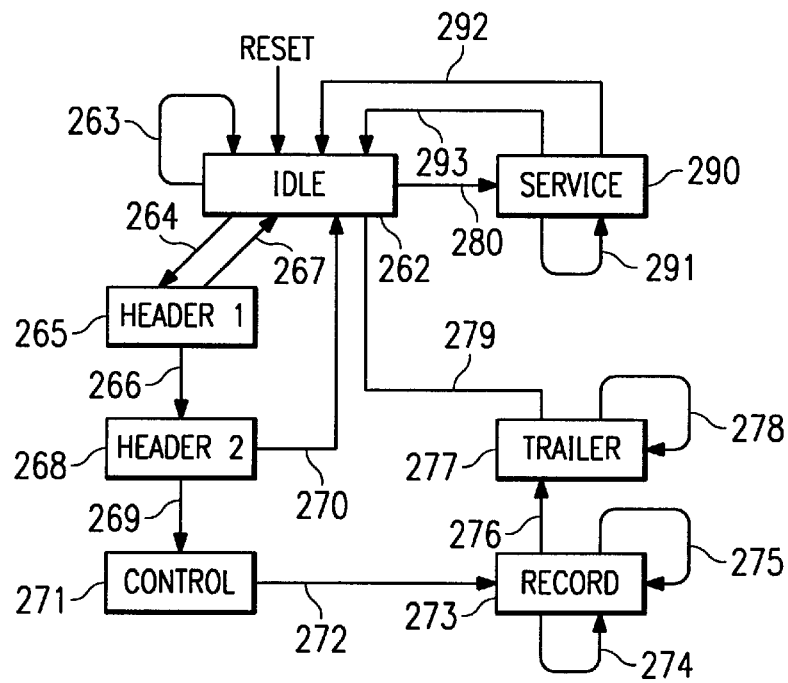
FIG. 13 is a message accumulation state diagram for a message handling module of FIG. 11.

FIG. 13 is a state diagram illustrating the process of accumulating bytes into packets in layer E.

In state 262 the process idles waiting for an input byte.

In state 262, if a received byte is a printable character, then control passes via 280 to state 290 where the process waits for a service signal.

In state 290, if a printable byte is received, then this is stored and control loops at 291. In state 290, if another control character is received, then all bytes are discarded and control passes via 292 to state 262. In state 291, if a carriage return or line feed byte is received, then this is discarded and a pad message is processed and control passes via 293 to state 262.

In state 262, if a received byte is a start of packet byte, then the byte is stored and control passes via 264 to state 265. In state 262, if a received byte is anything other than a start of packet byte or a printable character, the byte is discarded and control loops at 263.

In state 265, if a first header byte is received, then the byte is stored and control passes via 266 to state 268. In state 265, if any other byte is received, the all bytes are discarded and control passes via 267 back to state 262.

In state 268, if a second header byte is received, then the byte is stored and control passes via 269 to state 271. In state 268, if any other byte is received, the all bytes are discarded and control passes via 270 back to state 262.

In state 271, any byte received is stored, a message length is calculated, a new message condition is started and control passes to state 273.

In state 273, if a received byte does not complete a record, the byte is stored and control lops at 274. In state 273, if a received byte completes a record but no end of packet is received, then a new message record is started and control loops at 275. In state 273, if a received byte completes a record and an end of packet byte is received, then the byte is stored and control passes via 276 to state 277. In state 277, if a received byte does not complete a packet trailer, then the byte is stored and control loops at 278. If a received byte does complete a packet trailer, then the byte is stored and control passes via 279 to state 262. This completes the description of the state diagram of FIG. 13.

Returning to FIG. 11, layer D 242 is a layer which provides message composition/decomposition for messages in accordance with the X.28 format. Message packets are passed through this layer unchanged. This layer performs the following functions to provide encoding and decoding of pad to the X.28 standard. The functions are: send a wake-up string to the pad; send a message packet to the pad; decode an incoming pad message; send initialisation messages to the pad; send a call message to the pad; send a clear message to the pad; send a parameter request message to the pad to probe whether it is still there; and receive an incoming message packet.

Layer C 240 provides for call control. This layer maintains the connection with the transmission link (e.g., the pad 228) and makes network calls when message packet output is required. It also is responsible for breaking calls when they idle for too long. This layer performs the following functions to maintain the serial connection to the pad and to maintain the call through the X.25 network, namely: initialise the layer; perform background processing; respond to a call from layer D when a disconnect is detected; respond to a call by layer D when a connect is detected; respond to a call by layer D when a pad prompt is received; instruct the layer to create a connection with the management processor; send an application packet; respond to a call by layer D when communication with the pad is lost; receive an incoming message packet; and respond to a call by layer D to indicate receipt of the pad probe response.

The background processing function has the following tasks:

If the connection with the pad is down, a wake-up string is sent to the pad once per second until a pad prompt is received, this then triggers the initialisation of the pad.

If a call to the management processor is required and one is not currently in progress, a call is placed with the pad.

Every twenty seconds, if the pad is recorded as being connected, a probe message is sent to the pad including a request for the state of a pad parameter. If a response to this is not received within a ten second time-out period, the pad is assumed to be disconnected.

Layer B 236 provides functions for performing the exchange of authentication messages between the shelf controller and the management processor whenever a call is connected. The functions are: initialise the layer; request the creation of an authenticated link with the management processor; respond to call by layer C when a call is connected; respond to a call by layer 3 when an authentication message is received; respond to a call by layer C when a call is disconnected; send a message packet; and receive a message packet.

The level 2 composer 238 provides encoding functions for authentication messages. The functions are: encode a shelf controller ID (SC ID) message; encode an 'authentication reply' message; and encode a 'packet acknowledgement' message. Layer A 234 provides programming interface functions to layer 3 of the protocol stack. The functions are: initialise the layer; return TRUE if the layer can accept an output message; send an application packet; respond to call by layer B when a link is established; and receive a message packet.

The packet constructor 232 collects messages into packets for transmission and handles the re-transmission of packets in case of failure.

The record composers 230 are a series of modules which provide a layer between the encoded form of a message and the information which the message represents. These record composers actually form part of other subsystems that generate SMP messages and are only shown here to put the message handling modules into context.

The message class identifier 246 takes incoming packets and breaks them into their component messages (message records). Each message (message record) is then passed to an appropriate decoder module. This module is also arranged to track sequence numbers of received packets and generate appropriate acknowledgements. To do this it maintains in storage a list of received sequence numbers and the current window boundaries. Logic (typically implemented in software) then tracks the sequence numbers and interprets the sequences as described above to determine when to send an acknowledgement and what to send.

The packet constructor and the message class identifier form part of the layer 3 protocol.

Figure 12:
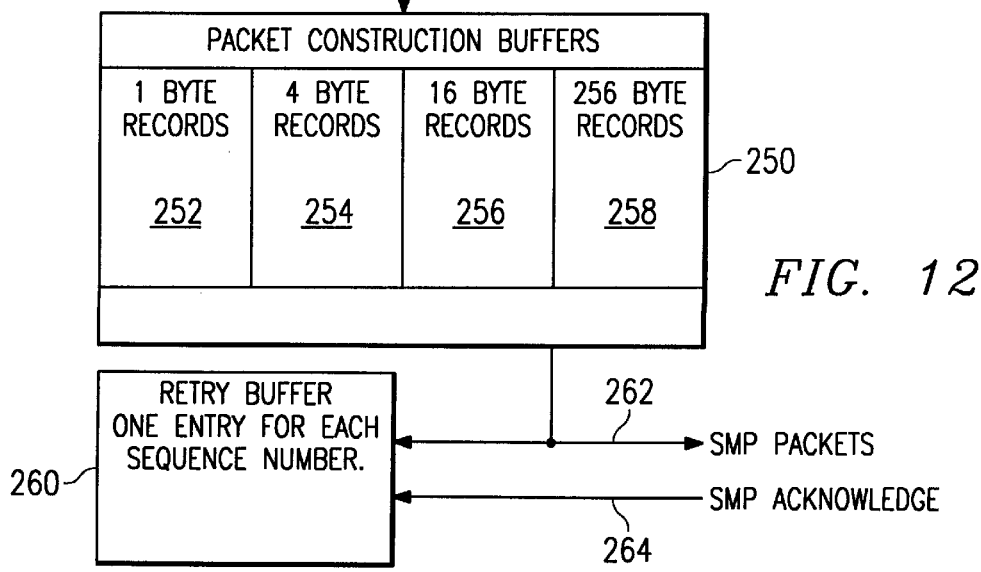
FIG. 12 is a schematic block diagram illustrating message packet construction for control messages in FIG. 11.

FIG. 12 illustrates the packet constructor module 232 in more detail. The data records for messages are assembled into packets by this packet constructor module. Incoming records at 248 are sorted into one of the four packet construction buffers 250 according to the data field size. Separate buffers 252, 254, 256 and 258 are provided for 1 byte, 4 byte, 16 byte and 156 byte data fields, respectively. When a buffer is full or in response to a predetermined transmit instruction, for example after a predetermined time has elapsed, the content of a buffer is sent over the transmission link and also copied to slot in a retry buffer 260 corresponding to the packet sequence number. There is one slot in the retry buffer for each sequence number. The retry buffer entry is cleared if an acknowledgement is received. If a retry instruction is received, the failed packet is re-transmitted directly from the retry buffer. If the retry buffer entry is not available to receive a packet from the packet construction buffers 150, or the number of packets awaiting transmission exceeds the size of the window, then the transfer and transmission is not performed. In this case, further requests to add message records are rejected until space becomes available. If a packet is not acknowledged within an acknowledgement timeout period, the packet is re-sent.

In this embodiment, the construction buffers 252, 254, 256 and 258 become full when they contain eighty-six 1 byte records, forty-three 4 byte records, fourteen 16 byte records or one 256 byte record.

The RLT protocol, which was introduced in the description of FIG. 10 will now be described in more detail.

The RLT protocol is used for passing control and data information via the control 212 and data 213 buses on the modem shelf and is valid on the radio link from the antenna 52 of the central terminal and the subscriber terminal(s) 20.

The RLT protocol is an unbalanced protocol with the master communications interface 73 in the shelf controller 72 acting as a busmaster (M) and the slave communications interfaces 69, 71 and 75 on the analogue card, the modem cards and the tributary unit acting as slaves. In this example, the master communications functions in the shelf controller are shared between a 68000 series microprocessor and a Hitachi H8 microcontroller, which will be referred to as the master client and master server, respectively. Alternatively, the client and server functions could be implemented on one microcontroller or processor. The slave communications processing functions in the tributary unit are also shared between a 68000 series microprocessor and an H8 microcontroller. In the other slave units, the slave communications processing is performed in a Hitachi H8 microcontroller, which will hereinafter be referred to as the slave server.

Figure 14:
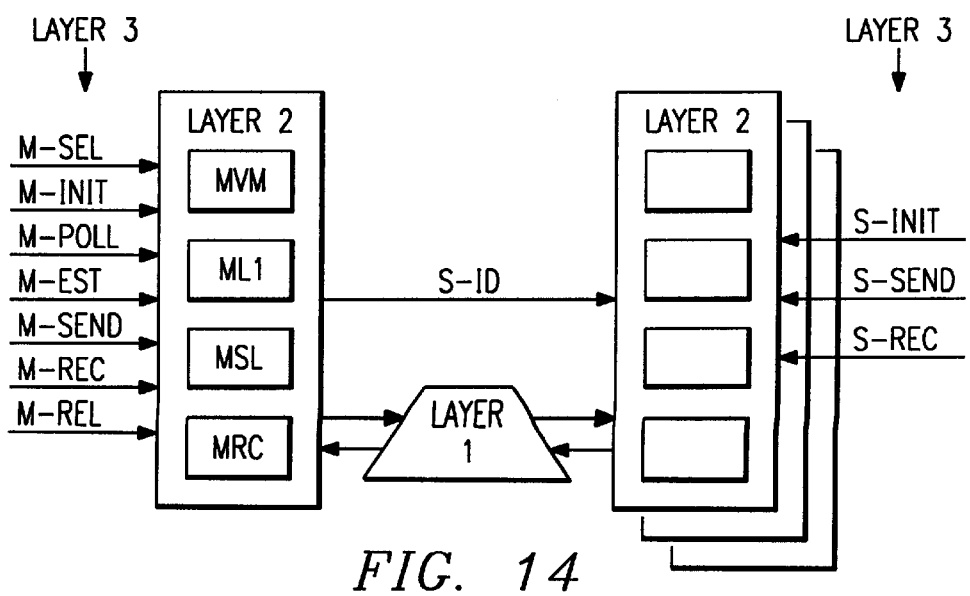
FIG. 14 is a schematic diagram illustrating the different protocol levels for connection of a master to a slave for communication between a shelf controller and slave elements.

The second protocol is based on three layers. FIG. 14 is a schematic representation of this layered protocol structure.

The master communications end point functions performed at the third layer include the following functions.

A master initialisation service process (M-INIT) sets up the master client part of the master communications end-point in the shelf controller. This service call must be executed before the other communications functions can be performed.

A master initialisation poll process (M-POLL) initialises the master server part of the master communications end-point. This service process must be called before the following functions can be performed.

A master establish process (M-EST) establishes a connection over the bus from the master to a slave in response to a slave address referencing a slave board. Messages can be sent and received once a connection has been established.

A master send process (M-SEND) takes a message and sends it to a nominated slave over the bus as long as the connection to the slave has already been established.

A master receive process (M-REC) receives a message from a slave to be passed, for example, to a management processor.

A master release process (M-REL) releases a connection to a nominated slave preventing further send and receive functions from being performed.

A master select process (M-SEL) provides an addressing mechanism for the master to select one of the slaves with which to communicate.

The slave communications end-point functions performed at the third layer include the following functions.

A slave initialisation service process (S-INIT) initialises the slave communications end-point. This service function must be called before any of the other functions can be performed.

A slave send process (S-SEND) takes a message and sends it to the master, as long as the master has already established a connection to the slave.

A slave receive process (S-REC)function receives a message from the master to be passed, for example, to a network service element addressed by the message.

The master communications end-point M includes the following functional components.

A master VM component (MVM) provides a set of services for the management of storage to dynamically allocate memory for buffers, queues, semaphores and timers.

A master layer 1 component (ML1) provides low level communication primitives for supporting byte transfer from the master server using a serial communication interface.

A master status list component (MSL) holds the status of each link from the master to one of the slaves. This is updated when a connection is made, broken or released.

A master retry count component (MRC) tracks the number of retires attempted in master to slave layer 2 communications. If this exceeds the limits for layer 2, the master breaks the connection with the slave.

The slave communications end-point M includes substantially the same functional components as the master.

The master layer 1 component (ML1) provides the following level 1 functions.

A master layer 1 initialisation process initialises the layer 1 communications system. No layer 1 communications can take place until this process has been invoked.

A master layer 1 byte-output process outputs a byte out of a serial communications port and waits for an acknowledgement from the receiver. If no acknowledgement is forthcoming, then a failure is registered.

A master layer 1 data-out process is similar to the byte output process except that more than one byte can be transferred.

A master layer 1 address-out process is similar to the byte output process except that the source byte is output with a bit set to indicate that this relates to a multiprocessor address rather than a data byte.

A master layer 1 data-in process waits for a specified number of bytes to be received on the communications port. If less than the required number of bytes is received, then a failure is registered.

The master VM component (MVM) provides the following functions:

A master VM initialisation process initialises the master VM component. This must be called before any other VM service.

A master VM get-message process removes a message from one of the queues held by the VM component.

A master VM put-message process places a message on one of the queues held by the VM component.

A master VM queue-full process indicates whether a selected queue is full.

A master VM get-buffer process allows a buffer to be requested from a buffer pool held by the VM component.

A master VM give-buffer process allows a buffer requested by the get-buffer process to be returned to the pool.

A master VM get-semaphore process allows a semaphore held by the VM component to be set.

A master VM give-semaphore process allows a semaphore set by the get-semaphore process to be cleared.

A master VM set-timer process sets a time-out period for one of the timers held by the master VM component. A flag is set by the master VM component when the timer expires.

A master VM add-timer function process registers an application function with the master VM component to be called at a particular time.

The master and the slaves both use VM components to provide buffers, queues, semaphores and timers in order to permit the transfer of messages. The operation of the second protocol will be illustrated by reference to specific examples below:

The first example relates to the establishment of a connection from a master to a slave.

Figure 15:
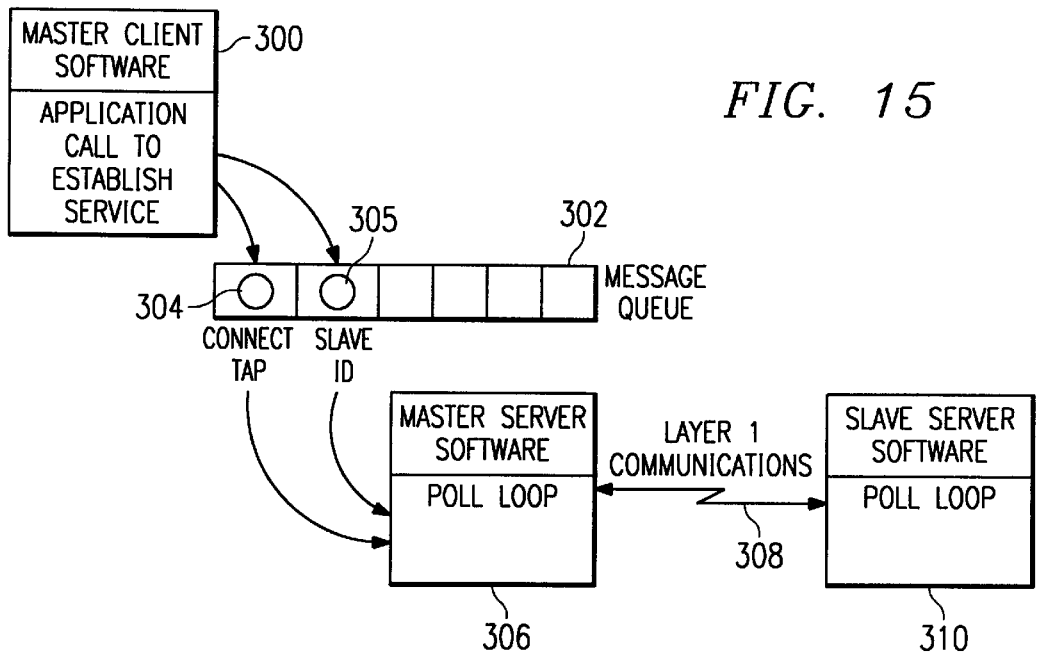
FIG. 15 is a schematic diagram illustrating the establishment of connection of a master to a slave for communication between a shelf controller and slave elements.
Figure 17:
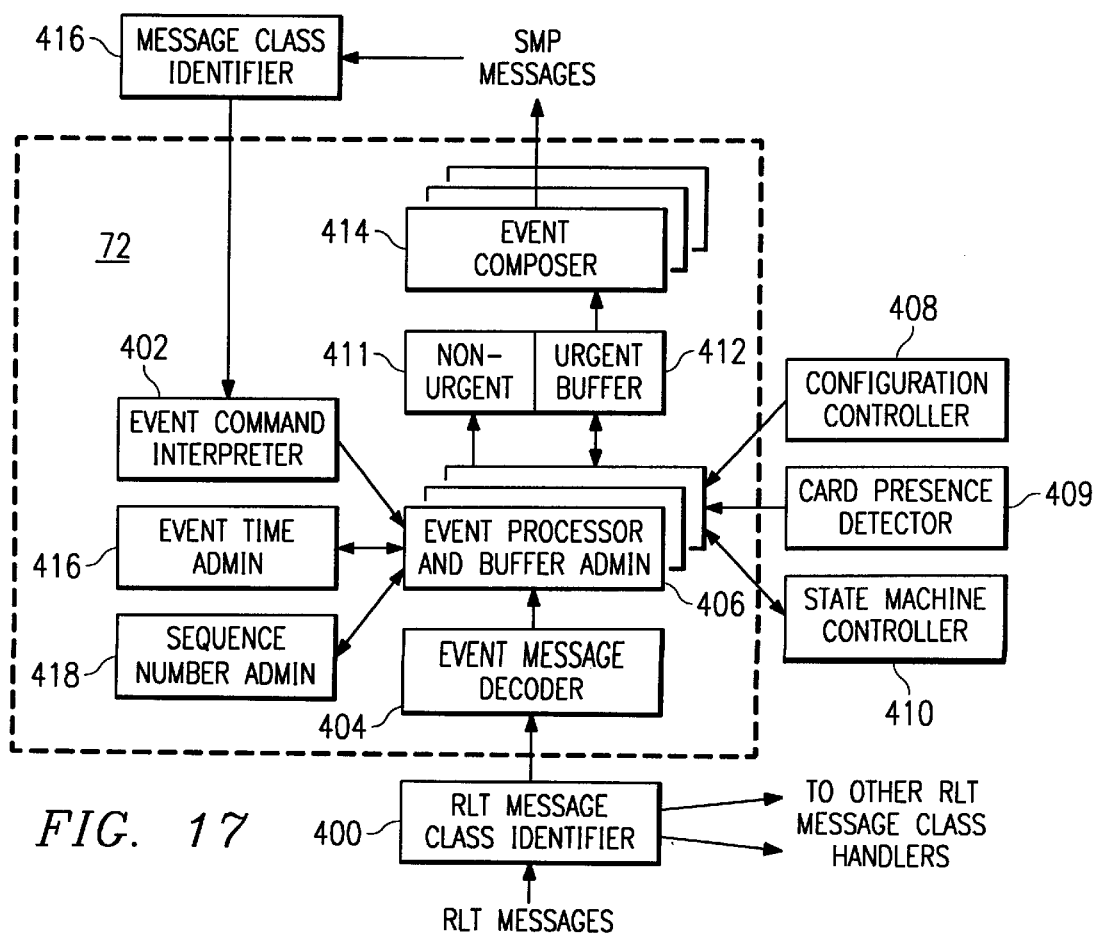
FIG. 17 is a schematic block diagram illustrating event handling by a shelf controller.

To connect the shelf controller master to one of the slaves, the shelf controller invokes the master establish process in the master end-point and supplies the link address of the slave (S-ID) with which the connection should be made. FIG. 15 illustrates how the master 300 maintains a message queue 302 to store requests such as an establish request, and how these requests are handled.

Invoking the master establish process has the effect of placing a connect tag 304 onto the message queue along with the address (S-ID) 305 of the slave with which the connection is to be made. The work queue is shared between the client and server portions of the master end-point allowing a master client application to place a connect tag onto the message queue via the establish process and the master server to remove it and act upon it as part of the server poll processes. With this mixed client and server implementation, poll processes are introduced between the master and slave as set out below:

A master poll process 306 is provided in the master server and is called repeatedly on the master server. This services all of the requests placed in the message queue by the client.

A slave poll process 310 is provided in the slave server and similarly is called repeatedly on the slave server.

When called, the master poll process checks the message queue for requests and in this case extracts a connect tag and the slave address from it. The pool process then sends out a connect command 308 to the nominated slave and awaits a response. If the response is valid, the status of the link to the selected slave is changed to 'connected', allowing the send and retrieve services to be used.

Figure 16:
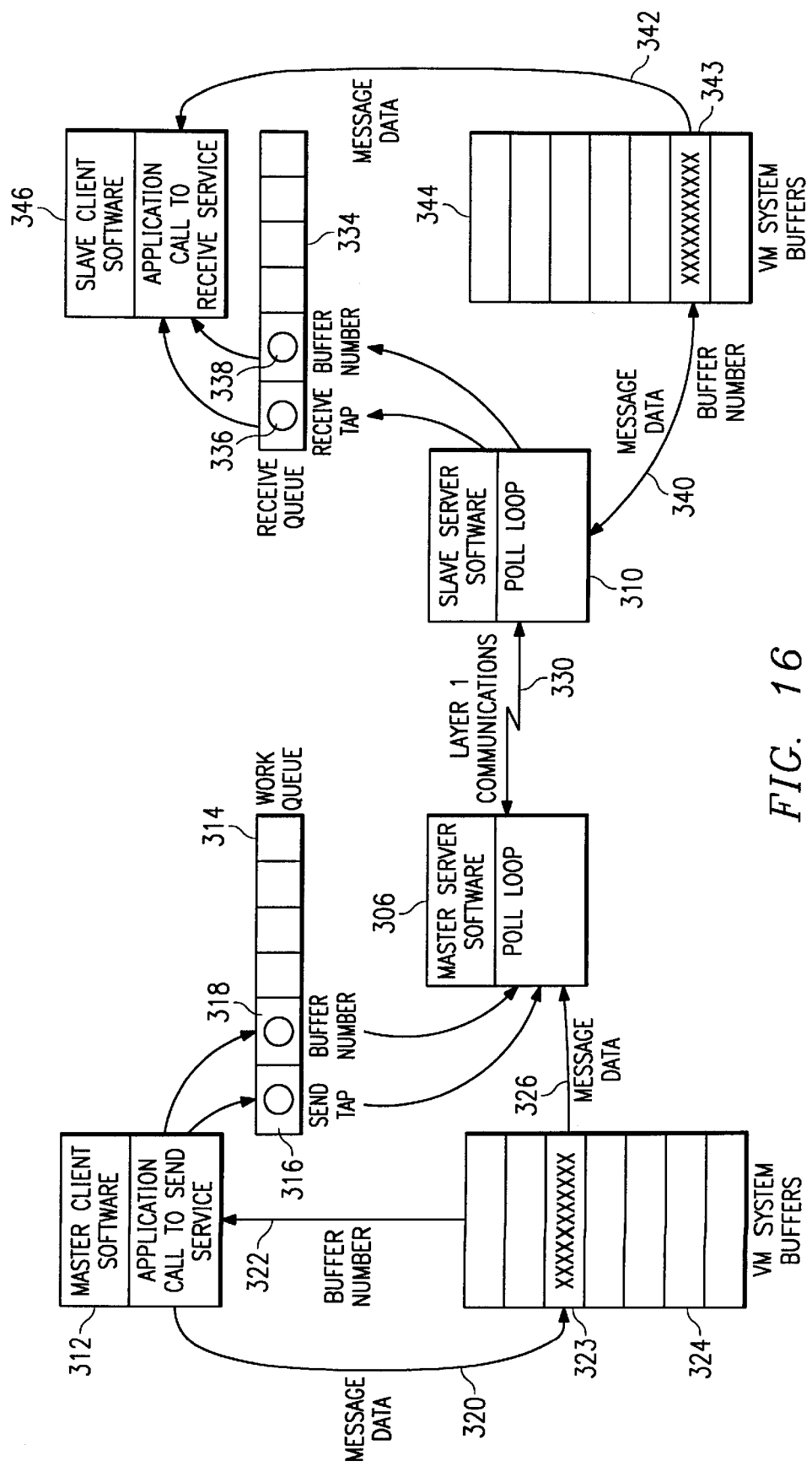
FIG. 16 is a schematic diagram illustrating the sending of a message from the shelf controller to a slave element.

The second example relates to the sending of a message from the master to a nominated and connected slave. This is illustrated in FIG. 16.

In order to send a message from the master to the nominated and connected slave, an application invokes the master send process 312. The send process requests a buffer 323 from the master VM component buffers 324 and copies the message to be sent to it. It then places a send tag 316 and the buffer number 318 on the work queue 314 for a subsequent poll call to deal with.

The master poll process 306 extracts the send tag 316 and the buffer number 318 from the message queue 314. It uses the buffer number 318 to extract 326 the message from the buffer 323 and then sends 330 the message to the nominated slave.

The message is received at the slave end-point under interrupt. At the next call to the slave poll process 310, a buffer 343 is requested from the slave VM component buffers 344 to hold the incoming message. The slave poll process 310 then places the message into the buffer 343 and puts a receive tag 336 and the buffer number 338 onto the slave receive queue 334. Messages can be received and put into the slave receive queue 334 until either the queue is full or no further buffers are available in the slave VM component buffers 344. Once a message has been transmitted and successfully received, the master gives its message buffer back to the master VM component for re-use using the master give-buffer process.

The message is delivered to the application when the application invokes a slave receive process 346. The receive process 346 checks the receive queue 334 for entries and, on finding one, extracts the buffer number 338 and reads the incoming message from the buffer 343. The buffer 343 is then returned to the slave VM component for re-use.

The sequence for sending a message from the slave to the master is similar except that the slave holds a separate send queue, rather than placing send and receive tags on the message queue. Send requests are placed on the send queue by client calls to the slave send process. When a slave receives a ready-to-receive command from the master, the slave poll process removes a send request and a buffer number from the send queue, gets the message from the slave VM buffer and transmits it to the master. At the end of the sequence it returns the buffer to the slave VM component for reuse.

The second protocol uses a sequence number, which alternates between 1 and 0, for passing messages between the master and the slave. An example of a message exchange is set out below.

Initially an exchange between the master and the slave establishes a link as part of a level 2 process.

| Master | | Slave |
|---|---|---|
| Poll (address) | --> | |
| | <-- | Response (data or not) |
| Reset | --> | |
| | <-- | Reset response |

Then a data message exchange takes place as part of a level 1 process.

| Master | | Slave |
|---|---|---|
| SEND (0) data | --> | |
| | <-- | SRR (1) |
| MRR (0) | --> | |
| | <-- | DATA (1) |

In this process the 1 or 0 between brackets associated with each message forms the sequence number, which can be represented by a single bit which is switched by a recipient of a message before a reply is sent in response to the successful receipt of the message. If the message is not received correctly, then the sequence number is not switched. This is illustrated in the following example.

| Master | | Slave |
|---|---|---|
| SEND (0) data | --> | |
| | <-- | SRR (1) |
| MRR (1) | --> | |
| | <-- | SRR (0) |
| MRR (1) | --> | |
| | <-- | DATA (0) |

In the sequence shown immediately above, the SRR message transmitted by the slave was not correctly received by the master. Accordingly, a response was sent without changing the sequence number. This then caused the slave to re-send the SRR message and the sequence proceeds as before but with the sequence numbers now inverted with respect to the first example.

In practice the sequence number is provided twice in a message byte, in two bits, although it could alternatively be provided only once, in one bit.

The shelf controller provides an interface between the SMP and RLT protocols. The shelf controller operates mainly in accordance with the first protocol, but is provided with the microprocessor and a communications microcontroller which together form a client/server end point for the second protocol and convert messages from one protocol to the other. FIG. 16 illustrates an example of how the shelf controller provides an interface between the messages sent in accordance with the two protocols, in this case for event handling.

An event command interpreter 402 decodes event commands received from the management processor under the SMP protocol and appropriate functions from other event modules are called to implement the command.

An event message decoder decodes an incoming message received from one of the slave modules under the RLT protocol and calls appropriate functions from the event controller.

An event processor 406 provides one function for each event message type and, in addition, functions which service internal events from a configuration controller 408 and other sources such as a card presence detector 409 and a state machine controller 410 in the shelf controller. The functions include passing events to either a non-urgent buffer 411 or to an urgent buffer 412 and directing movement of buffer contents to and from the management processor in response to control messages.

An event composer 414 allows the constructions of messages for sending under the SMP protocol containing event records and other related matters.

An event time administrator 416 marks the events with the time they are received by the event processor. A sequence number administrator 418 handles the assignment of sequence numbers to event messages. A separate current sequence number is maintained for each event.

Similar processing is performed for alarms and other messages.

Figure 18:
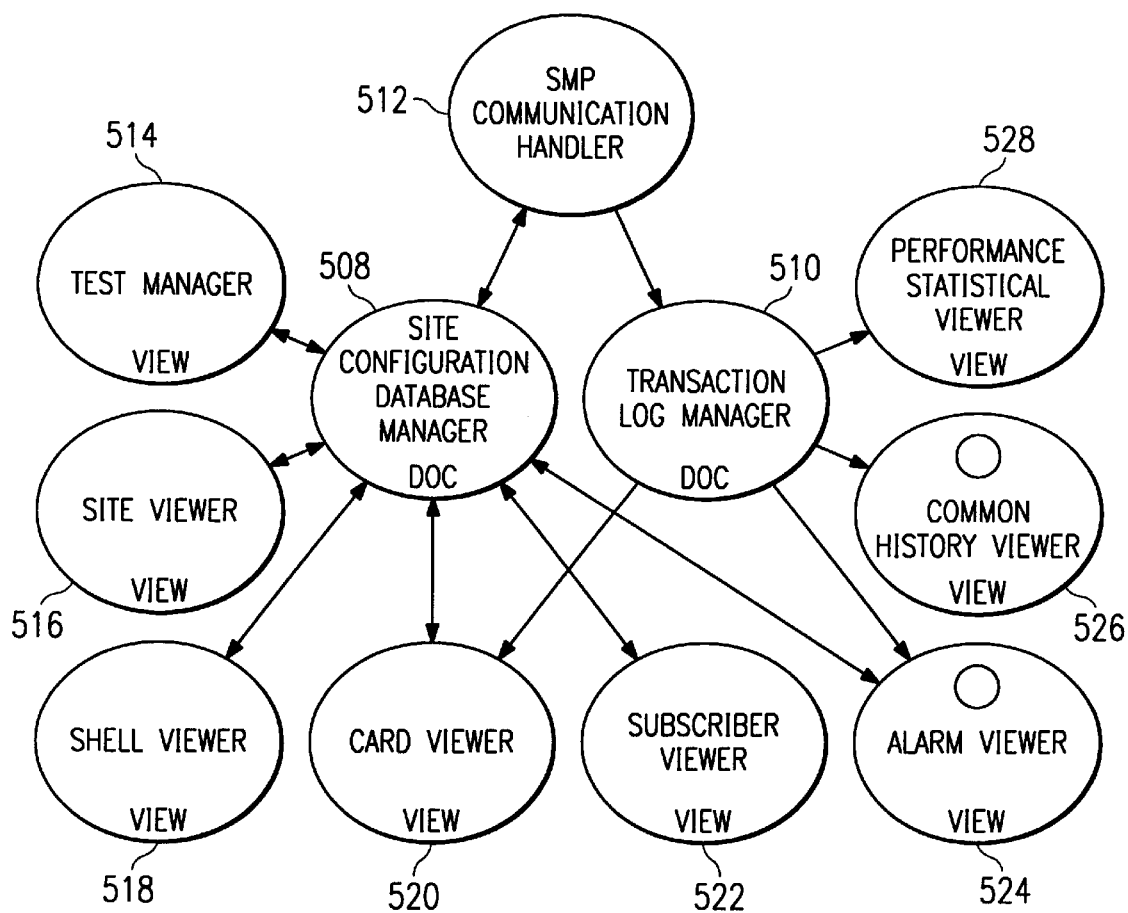
FIG. 18 is a schematic block diagram illustrating control structures of a control terminal site controller.
Figure 19:
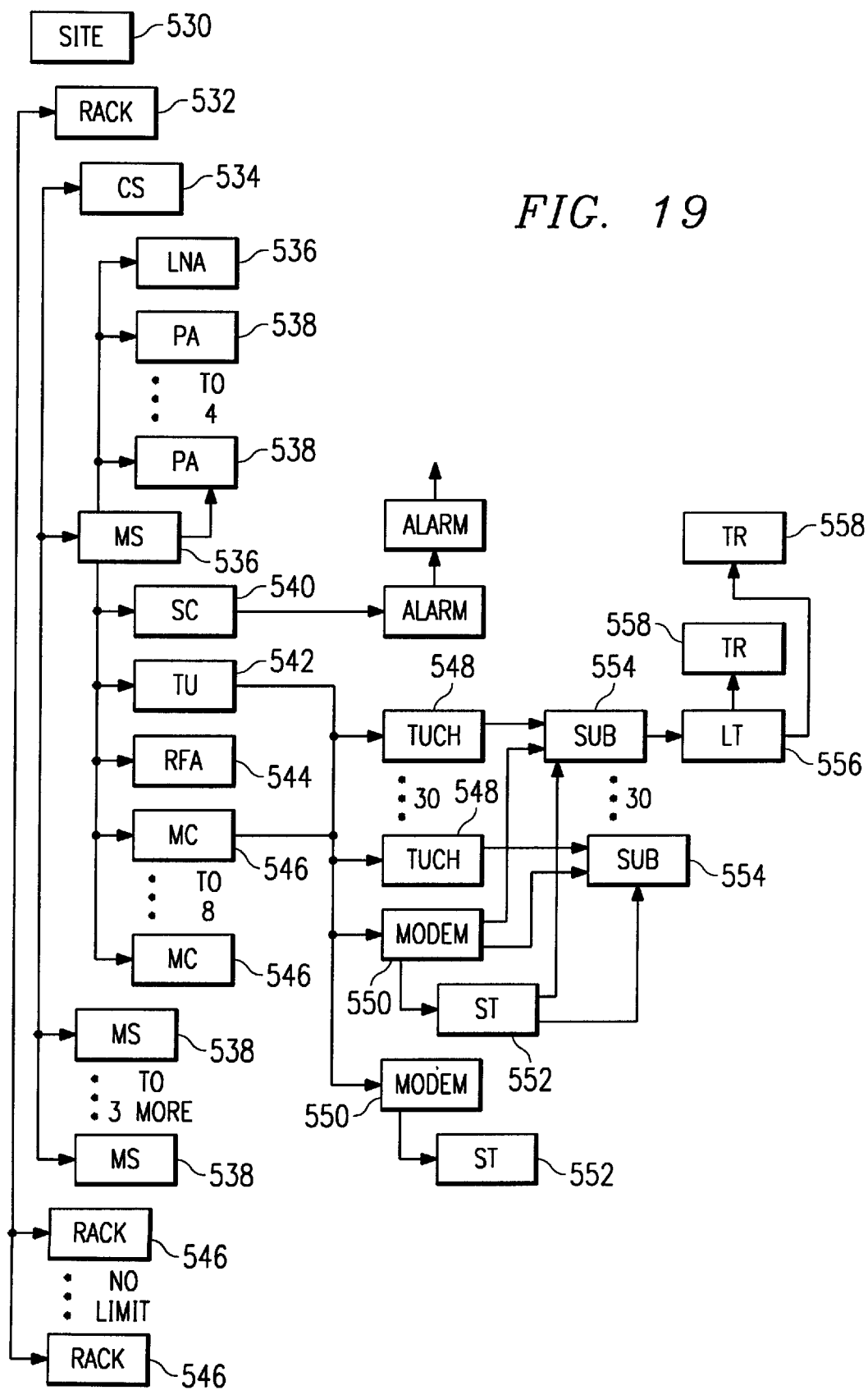
FIG. 19 is a schematic block diagram illustrating a configuration data base structure of a control terminal site controller.

FIG. 18 is a schematic overview of the site controller and illustrates the relationship between various server objects. The management of the telecommunications network including the central terminal, the subscriber terminals and the site controller, is based on a hierarchical object-based data structure. FIG. 19 provides one possible overview of that data structure.

The SMP communications handler 512 is responsible for the transmission and reception of SMP messages between the site controller and the shelf controller. A test manager 514 carries out line tests. A site viewer 516 enables a view to be created of the whole site using data contained in the site configuration database which is managed by the site configuration database manager 508.

The site configuration database contains an object-based structure where a plurality of objects, each representing a respective element of the site, are arranged in a structured hierarchy. FIG. 18 represents an example of such a structured data base. The various objects in the list are linked together by at least one pointer for each node which points to its parent object. This process continues right up to the root node which represents the whole site.

Various objects will be described in more detail below. Each of the objects includes a name field defining the name of the object and a status field containing status information about the object. The object may also contain one or more alarm parameters which can be set in response to specific alarm conditions relating, for example, to hardware errors, line malfunctions etc. The status field for an object includes a fault parameter which becomes set when at least one alarm parameter in the object or in a dependent object is set. In other words, when a fault parameter is set in one object, this fault status is propagated up the tree using the pointers to successive parent objects. Each of the objects also contains a definition of the object which can be used for displaying a representation, or view, of that object.

There is one site object (SITE) 530 in a database. This contains data about the site and is created automatically when the database is initialised. As well as a name field and a status field, this object contains a field defining the site location and a list of rack objects that the site contains.

The Rack objects (RACK) 532, 540, 542, etc. each represent a rack and contain data about the rack including a name field, a status field, a pointer to the site object 530, and pointers to the shelf objects (e.g., for rack object 532, pointers to the combiner shelf object (CS) 534 and up to four modem shelves (MS) 536, 538).

The combiner shelf object (CS) 540 represents an RF combiner shelf and contains data about the combiner shelf including a name field, a status field, a pointer to the containing rack object (e.g., RACK 532), a pointer to the shelf's low noise amplifier card object (LNA) 536, and pointers to power amplifier card objects (PA) 538.

The modem shelf objects (MS) 536 and 538 each represent a modem shelf and contain data about the modem shelf including a name field, a status field, a pointer to the containing rack object (e.g., RACK 532), an identifier field for the position of the shelf in the rack, a field for the identity of the serial port through which the site controller communicates with the shelf, a field for the baud rate for the serial port, a pointer to the shelf controller card object (SC) 540, a pointer to a tributary card object (TU) 542, a pointer to the RF analogue card object (RFA) 544, and pointers to up to eight modem card objects (MC) 546.

The modem card objects (MC) 546 each represent a modem card and contain data about the card including a name field, a status field, a pointer to the modem shelf object (e.g., MS 536) containing the modem card, an identifier number for the modem card (0–7) and pointers to modem objects (MODEM) 550.

The modem objects (MODEM) 550 each represent a modem and contain data about the modem including a name field, a status field, a pointer to the modem shelf object (e.g., MS 536), a pointer to the subscriber terminal object (ST) 552 which is connected via the radio link to the modem, pointers to subscriber objects (SUB) 554 supported by the modem and pointers to the tributary unit channel objects (TUCH) 548 which connect to the modem.

The shelf controller card object (SC) 540 represents a shelf controller and contains data about the card including a name field, a status field and a pointer to the modem shelf object (e.g., MS 536).

The Tributary unit card (TU) 542 represents a tributary card and contains data about the card including a name field, a status field, a pointer to the modem shelf object (e.g., MS 536), pointers to the card's tributary unit channels (TUCH) 548 and a definition field for the protocol used by the tributary card.

The RF combiner and analogue card object (RFA) 544 represents the RF card and analogue card pair and contains data about the card pair including a name field, a status field, a pointer to the modem shelf object (e.g., MS 536), a field representing the transmitter frequency and a field representing the receiver frequency.

The low noise amplifier card object (LNA) 536 represents a RF combiner shelf low noise amplifier card and contains data about the card including a name field, a status field and a pointer to the RF combiner shelf object (RFC) 534.

The power amplifier card objects (PA) 538 each represent an RF combiner shelf low noise amplifier card and contain data about the card including a name field, a status field and a pointer to the RF combiner shelf object (RFC) 534.

The subscriber terminal object (ST) 552 represents a subscriber terminal served by a modem and includes data about the subscriber terminal including a name field, a status field, the CDMA code of the subscriber terminal channel and a pointer to the corresponding modem (MODEM) 550.

The subscriber objects (SUB) 554 each represent a subscriber circuit and contain data about the subscriber including a name field, a status field, a recall field, an intrusion tone field and a subscriber line active field as well as a pointer to the modem (MODEM) 550 and the tributary unit channel (TUCH) 548 associated therewith.

A line test object (LT) 556 represents a line test in progress and contains data about the line test including a name field, a status field and a pointer to the subscriber object 554.

A test result object (TR) 558 indicates a test result and contains data about the test result including a name field, a status field and a pointer to the line test object which initiated the test.

Uncleared alarm objects 559 are chained to their source card.

Returning to FIG. 18, the transaction log manager 510 contains a history of all the configuration messages sent to the site's shelves and all the event and performance messages received from the shelves, subject to log file size limits.

The site viewer 516 allows an operator to monitor the state of the site. The site viewer provides alternative views of the site to be displayed on the display screen of the site controller workstation using the data stored in the object database.

In accordance with a first view, the site viewer provides a view showing the main nodes of the object based hierarchy, namely a representation of the site object node with a representation of each of the rack object nodes connected thereto and the links between them, corresponding to the pointers in the objects. The display can be structured similarly to the representation in FIG. 19, but without the lower order objects being displayed.

The user can interact with this first view, for example to expand one branch of the view. This can be achieved using conventional windows-based operating tools for pointing to and selecting an displayed object using a mouse and mouse buttons, for example. The daughter nodes for a selected node can then be displayed. This process can be used, for example, to expand branches of a tree to locate faults.

The site configuration database manager interacts with the object database to monitor and update fault parameters and alarm parameters in the database objects. When an alarm condition occurs in a network element, the database manager sets the corresponding alarm parameter in the object for that network element. At the same time the fault parameter is set for that database object. A database object may contain more than one alarm parameter. The fault parameter in the object database status field is set whenever one or more alarm parameters are set in that database object. The database manager also traces the pointers up the tree to the site object setting the fault parameters for each of the database objects which it encounters on the way.

The site viewer, and also the other viewers to be described later, are responsive to the fault parameters in the database objects to visually distinguish displayed objects for which a fault parameter has been set. Typically the fault conditions is displayed by changing the displayed colour of the object in question, and/or by causing the object in question to flash. In a preferred embodiment, a displayed object for which a fault condition has occurred is flashed red.

In the situation where the first site view mentioned above is displayed, the site object and the rack object corresponding to the rack in which a fault has occurred will flash red. This will alert the operator to the fault condition, and by selecting the appropriate displayed rack object, the database tree structure can be expanded along the appropriate branch down to the object corresponding to the network element where the fault has occurred.

Alternative display expansion modes can be provided where the tree is automatically expanded when a fault occurs, or when the operator requests the expansion of the tree (for example by selecting the lowest order object currently displayed in the fault line) or where the tree has to be expanded manually level by level by the operator selecting the appropriate object to be expanded.

A second site view is also provided where a graphical representation of each rack on the site is displayed to the operator on the display of the site controller work station. Each rack object includes a rack identifier so that each displayed representation of a rack corresponds to a physical rack. The site viewer causes the objects for the racks to be accessed via the database manager 508 in order to display an appropriate graphical representation of each of the rack frames with openings for the rack shelves. These openings are then filled with representations of the fronts of the respective shelves. The site viewer causes the objects for the shelves to be accessed via the database manager 508 in order to display a graphical representation of each shelf front in an appropriate opening in the graphical representation of corresponding rack frame. The combiner shelf always occupies a fixed position within the rack and the modem shelf objects contain an identifier field for the position of the shelf in the rack, so that each representation of a shelf front in the rack display corresponds to a physical rack shelf position.

In this case, when the fault parameter in a shelf object is set, the representation of the shelf on the display will be highlighted (e.g., by displaying the shelf in a different colour or flashing). Accordingly, simply by viewing the display, the operator can immediately identify which rack has a shelf with a fault and the physical position of the shelf within the rack.

Moreover, the site viewer is responsive to the operator selecting the highlighted shelf (eg by clicking on a mouse button when a mouse pointer is pointing at the shelf in question) to call the shelf viewer 518. The shelf viewer 520 causes a graphical representation of the shelf of interest to be displayed on the workstation display. It does this by causing the object for the shelf concerned to be accessed via the database manager 508 to display an appropriate graphical representation of the shelf. Also, the shelf viewer causes the objects for the cards on the shelf to be accessed via the database manager 508 to display a graphical representation of each card on the shelf. The card objects include data defining the object view and the position of the card within the shelf view. The shelf viewer is responsive to a fault parameter being set in the object for a card on the shelf to highlight the graphical representation of that card. In this way the operator can readily identify the physical card in which an error has occurred.

The shelf viewer is responsive to the operator selecting the highlighted card (eg by clicking on a mouse button when a mouse pointer is pointing at the card in question) to call the card viewer 520. The card viewer 518 causes a graphical representation of the card of interest to be displayed on the workstation display. It does this by causing the object for the card concerned to be accessed via the database manager 508 to display an appropriate graphical representation of the card. Also, the card viewer causes the objects for the network elements on the card to be accessed via the database manager 508 to display a graphical representation of each element on the card. The network element objects include data defining the object view and the position of the element on the card view. The card viewer is responsive to a fault parameter being set in the object for a network element on the card to highlight the graphical representation of that element. In this way the operator can readily identify the physical element in which an error has occurred.

The subscriber viewer 522 extends this process to a view of the subscriber line and the subscriber terminal 20.

It will be appreciated that the mechanism described above provides an effective and user friendly arrangement for identifying faulty components or elements within a network.

The updating of the fault parameters described above is performed by the site configuration database manager in response to alarm event messages received using the message structures described above from the physical elements at which faults have occurred. The alarm event messages are used to set alarm parameters in the lowest order objects associated with physical network elements. The establishment of alarm conditions (faults) can be achieved in any appropriate manner, either by commands sent out from the site controller or other control elements in the network at appropriate times to test for faults, or by the elements where a fault has occurred automatically reporting the faults to the site controller.

An alarm viewer 524 enables alarm events occurring at a site to be monitored on the display of the site controller work station. This provides a tabular display of all the events that have occurred in the system. One of the event entries in the tabular display will be highlighted by the alarm viewer to indicate the current event. The highlight can be moved through the use of cursor keys and/or mouse movements and clicks.

A command history viewer 526 is used to display transaction history data retrieved from the database. A performance statistical viewer 528 similarly permits the display of statistical data.

The site controller command structure described with reference to FIGS. 18 and 19 can be used for monitoring faults in a working network or for active control of the network. It can also be used as part of a simulator of part or all of the network for design and/or testing purposes.

Figure 20:
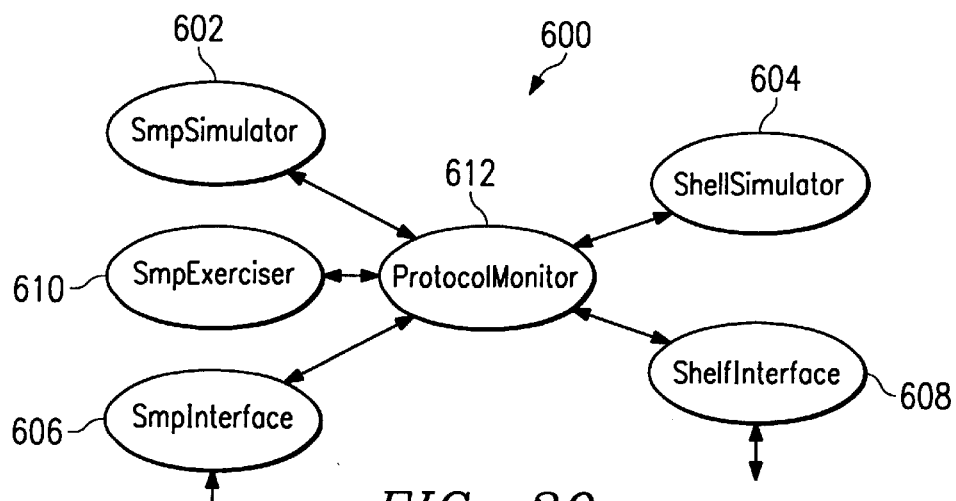
FIG. 20 is a schematic representation of the connection of a simulator to the central terminal of FIG. 3.

FIG. 20 is a schematic representation of elements of a simulator 600 incorporating the control structure described with reference to FIG. 18 and 19 can be switched into the X.25 connection 57 between an element manager 58 and a shelf controller 72. The simulator 600 can be implemented by means of a personal computer or workstation comprising a processor, memory, display, keyboard, etc., suitably programmed to implement the desired processing functions.

As illustrated in FIG. 20, the simulator 600 includes an SMP simulator 602 which provides a simulation of the management processor (the site controller 56 or the element manager 58) and a shelf simulator 604 which simulates the operation of a modem shelf 46. The SMP simulator can provide basic management processor functions for testing the SMP protocol only, but it could be expanded to provide a full emulation of the site controller. The shelf simulation includes a full emulation of the physical shelf controller using largely the same software as the physical shelf controller. It also provides a simulation of selected management functions of the network elements on the modem shelf which are connected to the shelf controller, to the extent that they are able to respond to commands from the shelf controller and to generate alarms and other status messages in response to being activated. In alternative embodiments a full simulation of the central station could be provided.

The simulator includes an SMP interface 606, including the modular message handling structure described with reference to FIG. 11, which enables a real management processor to interface with the simulator by providing an interface between serial communications and the simulator's internal representation of SMP messages. The simulator also includes a shelf interface 608, including the modular message handling structure described with reference to FIG. 11, which enables the simulator to interface with a real shelf via RS232 port.

The simulation of each of the various elements described above is embodied in objects which define those elements, each object containing a functional emulation of the element concerned.

An SMP exerciser 610 permits a user to construct low level SMP messages for testing the shelf controller on a message by message basis.

The protocol monitor 612 provides a monitor function for SMP messages as they pass between the other parts of the system. Thus messages are passed via the monitor with the monitor providing the necessary routing functions, allowing messages to be displayed, stored and stepped through and otherwise keep track of the messages being sent. As such, the simulator provides a powerful diagnostic tool for the telecommunications network.

Although a particular embodiment has been described herein, it will be appreciated that the invention is not limited thereto and that many modifications and additions thereto may be made within the scope of the invention.

What is claimed is:

1. Telecommunications apparatus for a central station of a wireless telephony network including a plurality of subscriber stations and said central station, which provides wireless communications with said subscriber stations via respective wireless links, said apparatus comprising:
    a plurality of modems for providing telephone connections via said wireless links;
    a tributary unit for connection to a public switched telephone network; and
    a control communications controller for the communication of control messages with an external network controller of said wireless telephony network, wherein said control communications controller is configured to enable the communication of control message packets with said network controller under a first, balanced, message protocol, where said control communications controller or said network controller is able to initiate an exchange of information;
    said control communications controller being further configured to enable the communication of control messages with said modems and said subscriber stations under a second, master-slave, message protocol, where said control communications controller acts as a master unit and said modems and subscriber units act as slave units with control messages being communicated to said subscriber units via said wireless links;
    said control communications controller being arranged to be responsive to a control message packet received from said network controller in accordance with said first message protocol to unpack said message packet, to establish a control link with an addressed slave unit and to transmit a control message in accordance with said second message protocol to said addressed slave unit; and
    said control communications controller being arranged to be responsive to a control message received in accordance with said second message protocol from a slave unit for which a control link has been established to assemble a message packet for said control message and to transmit said message packet to said network controller in accordance with said first message protocol.

2. Apparatus according to claim 1 wherein the apparatus is a modem shelf, and wherein said control communications controller is a shelf controller for controlling the functioning of said modem shelf.

3. Apparatus according to claim 2, comprising a bus interconnecting said shelf controller, said tributary unit and said modems.

4. Apparatus according to claim 1, wherein said control communications controller comprises an interface processor configured for converting between said first and second control message protocols.

5. Apparatus according to claim 4, wherein said interface processor is a microprocessor.

6. Apparatus according to claim 4, comprising a second interface processor, said first interface processor interfacing with said first message protocol, and said second processor interfacing with said second message protocol.

7. Apparatus according to claim 6, wherein said first interface processor is a microprocessor and said second interface processor is a microcontroller.

8. Apparatus according to claim 1, comprising an RS232 interface protocol for communicating with said network controller.

9. A central station for a wireless telephony network, which central station provides wireless telephonic communication with a plurality of subscriber stations via respective wireless links and comprises telecommunications apparatus according to claim 1.

10. A wireless telephony network comprising a network controller, a central station controlled by said network controller and a plurality of subscriber stations in wireless communication with said central station, the central station providing wireless telephonic communication with said plurality of subscriber stations via respective wireless links and comprising telecommunications apparatus according to claim 1.

* * * * *